US012397307B2

(12) United States Patent
Sakata et al.

(10) Patent No.: US 12,397,307 B2
(45) Date of Patent: Aug. 26, 2025

(54) TRIGGER-TYPE LIQUID SPRAYER

(71) Applicant: YOSHINO KOGYOSHO CO., LTD., Tokyo (JP)

(72) Inventors: Kota Sakata, Tokyo (JP); Kotaro Fujiwara, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 183 days.

(21) Appl. No.: 18/036,912

(22) PCT Filed: Nov. 11, 2021

(86) PCT No.: PCT/JP2021/041553
§ 371 (c)(1),
(2) Date: May 15, 2023

(87) PCT Pub. No.: WO2022/113751
PCT Pub. Date: Jun. 2, 2022

(65) Prior Publication Data

US 2023/0415183 A1 Dec. 28, 2023

(30) Foreign Application Priority Data

Nov. 30, 2020 (JP) ................................ 2020-199026
Dec. 25, 2020 (JP) ................................ 2020-217401

(51) Int. Cl.
*B05B 11/00* (2023.01)
*B05B 11/10* (2023.01)

(52) U.S. Cl.
CPC ........ *B05B 11/0044* (2018.08); *B05B 11/007* (2013.01); *B05B 11/0089* (2013.01);
(Continued)

(58) Field of Classification Search
CPC ............. B05B 11/0044; B05B 11/0089; B05B 11/1057; B05B 11/1067; B05B 11/007;
(Continued)

(56) References Cited

U.S. PATENT DOCUMENTS 5,628,434 A * 5/1997 Foster ................. B05B 11/1063
239/333
10,357,791 B2 * 7/2019 Kakuta ............... B05B 11/1057
(Continued)

FOREIGN PATENT DOCUMENTS

CN 108473238 B 5/2020
JP 2008-194642 A 8/2008
(Continued)

OTHER PUBLICATIONS

Apr. 9, 2024 Notice of Allowance issued in Japanese Patent Application No. 2020-217401.

(Continued)

*Primary Examiner* — Frederick C Nicolas
(74) *Attorney, Agent, or Firm* — Oliff PLC

(57) ABSTRACT

A trigger-type liquid sprayer includes a sprayer main body mounted on a container body, and a nozzle member having a spray hole, the sprayer main body includes a vertical supply tube, a trigger mechanism having a trigger portion, a reservoir cylinder into which a liquid that has passed through the inside of the vertical supply tube is supplied in response to rearward movement of the trigger portion, and a reservoir plunger movably disposed inside the reservoir cylinder and configured to move toward one side in response to supply of the liquid into the reservoir cylinder while being biased toward the other side, and a displacement curbing portion is provided between a rear cylinder portion of the reservoir cylinder protruding rearward beyond the vertical supply tube and the vertical supply tube and configured to curb displacement of the rear cylinder portion with respect to the vertical supply tube.

8 Claims, 12 Drawing Sheets

(52) U.S. Cl.
CPC ......... *B05B 11/1011* (2023.01); *B05B 11/104* (2023.01); *B05B 11/1057* (2023.01); *B05B 11/1059* (2023.01); *B05B 11/1063* (2023.01); *B05B 11/0008* (2013.01); *B05B 11/1067* (2023.01)

(58) Field of Classification Search
CPC ............... B05B 11/1011; B05B 11/104; B05B 11/1059; B05B 11/1063; B05B 11/0008
See application file for complete search history.

(56) References Cited

U.S. PATENT DOCUMENTS

| | | | | |
|---|---|---|---|---|
| 2017/0216863 | A1 | 8/2017 | Kakuta et al. | |
| 2017/0328361 | A1 | 11/2017 | Tu | |
| 2018/0369842 | A1* | 12/2018 | Kakuta | B05B 11/1011 |
| 2024/0009693 | A1* | 1/2024 | Sakata | B05B 11/1059 |
| 2024/0367189 | A1* | 11/2024 | Sakata | F04B 9/14 |

FOREIGN PATENT DOCUMENTS

| | | | |
|---|---|---|---|
| JP | 2014-166612 | A | 9/2014 |
| JP | 2015-062886 | A | 4/2015 |
| JP | 2016-203141 | A | 12/2016 |
| JP | 2017-131864 | A | 8/2017 |
| JP | 2017-213497 | A | 12/2017 |
| JP | 2018-69186 | A | 5/2018 |
| JP | 2019-177897 | A | 10/2019 |
| WO | 2006/073307 | A1 | 7/2006 |

OTHER PUBLICATIONS

Dec. 14, 2021 International Search Report issued in International Patent Application No. PCT/JP2021/041553.

Oct. 9, 2024 Extended Search Report issued in European Patent Application No. 21897725.4.

* cited by examiner

TRIGGER-TYPE LIQUID SPRAYER

TECHNICAL FIELD

The present invention relates to a trigger-type liquid sprayer.

Priority is claimed on Japanese Patent Application No. 2020-199026, filed Nov. 30, 2020, and Japanese Patent Application No. 2020-217401, filed Dec. 25, 2020, the contents of which are incorporated herein by reference.

BACKGROUND ART

A trigger-type liquid sprayer sucking up a liquid from the inside of a container body and spraying the liquid through a spray hole by operating a trigger portion is known.

Regarding this kind of trigger-type liquid sprayer, for example, as disclosed in the following Patent Document 1, a trigger-type liquid sprayer including a sprayer main body which is mounted on a container body configured to accommodate a liquid therein, and a nozzle member having a spray hole for spraying a liquid is known.

The sprayer main body mainly includes a vertical supply tube sucking up a liquid inside the container body, a trigger portion disposed to be movable rearward in a state in which the trigger portion is biased forward and configured to cause the liquid to flow toward the spray hole through the inside of the vertical supply tube in response to rearward movement of the trigger portion, a reservoir cylinder into which a liquid that has passed through the inside of the vertical supply tube is supplied in response to rearward movement of the trigger portion, and a reservoir plunger movably disposed inside the reservoir cylinder and configured to move rearward in response to supply of the liquid into the reservoir cylinder while being biased forward by a bias member.

In the trigger-type liquid sprayer described above, a liquid can be sprayed to the outside through the spray hole while a liquid is reserved inside the reservoir cylinder by operating the trigger portion, and even when the trigger portion is not operated, a liquid can be sprayed utilizing the reservoir plunger. Accordingly, continuous injection of a liquid can be performed.

CITATION LIST

Patent Document

[Patent Document 1]
Japanese Unexamined Patent Application, First Publication No. 2017-213497

SUMMARY OF INVENTION

Technical Problem

A trigger-type liquid sprayer provided with the reservoir cylinder described above may be elongated in a forward/rearward direction in order to secure a sufficient internal volume (internal capacity) of the reservoir cylinder. Specifically, the reservoir cylinder may be formed above a vertical supply tube and extend rearward beyond the vertical supply tube. Since the reservoir cylinder protrudes rearward beyond the vertical supply tube, an external force is likely to act on the reservoir cylinder due to a drop impact, external contact, or the like.

Particularly, when the trigger-type liquid sprayer is dropped, since the reservoir cylinder is positioned above the vertical supply tube, the reservoir cylinder is likely to face downward so that a drop impact acts on the reservoir cylinder. For this reason, there is a possibility that the reservoir cylinder may be displaced (deformed) such that the reservoir cylinder is folded starting from a connected portion between the reservoir cylinder and the vertical supply tube due to a rotation torque or the like caused by a drop impact, resulting in a possibility of breakage of the reservoir cylinder.

The present invention has been made in consideration of such circumstances, and an object thereof is to provide a trigger-type liquid sprayer having exceptional impact resistance.

Solution to Problem

According to an aspect of the present invention, there is provided a trigger-type liquid sprayer including a sprayer main body mounted on a container body configured to accommodate a liquid therein, and a nozzle member having a spray hole for spraying a liquid forward, the nozzle member being mounted on a front end portion of the sprayer main body, in which the sprayer main body includes a vertical supply tube extending in an upward/downward direction and configured to suck up the liquid in the container body, a trigger mechanism having a trigger portion disposed in front of the vertical supply tube to be movable rearward in a state in which the trigger portion is biased forward, the trigger mechanism being configured to cause the liquid to flow from an inside of the vertical supply tube toward the spray hole in response to rearward movement of the trigger portion, a reservoir cylinder into which a liquid that has passed through the inside of the vertical supply tube is supplied in response to rearward movement of the trigger portion, and a reservoir plunger disposed inside the reservoir cylinder to be movable in an axial direction along a center axis of the reservoir cylinder, and configured to move toward one side in the axial direction in response to supply of the liquid into the reservoir cylinder while being biased toward the other side in the axial direction, the reservoir cylinder is disposed above the vertical supply tube, intersects a center axis of the vertical supply tube, and protrudes rearward beyond the vertical supply tube, and a displacement curbing portion is provided between a rear cylinder portion of the reservoir cylinder protruding rearward beyond the vertical supply tube and the vertical supply tube, the displacement curbing portion being configured to curb displacement of the rear cylinder portion with respect to the vertical supply tube.

In this case, as the trigger portion is operated to be moved rearward, a liquid can be caused to flow from the inside of the vertical supply tube toward the spray hole. Accordingly, a liquid can be sprayed forward through the spray hole of the nozzle member.

Moreover, while a liquid is supplied to the inside of the reservoir cylinder through the inside of the vertical supply tube, a liquid can be sprayed through the spray hole and the inside of the reservoir cylinder can be compressed. Therefore, the reservoir plunger can be pushed toward one side in the axial direction against forward biasing, and the reservoir plunger can be moved toward one side in the axial direction while a liquid is sprayed. For this reason, every time an operation of pulling the trigger portion is performed, a liquid can be sprayed while the reservoir plunger is moved to one side in the axial direction to store (fill) a liquid inside the reservoir cylinder.

If an operation of the trigger portion is stopped after the inside of the reservoir cylinder is filled with a liquid, supply of a liquid to the inside of the reservoir cylinder through the inside of the vertical supply tube stops, but the reservoir plunger begins to move back toward the other side in the axial direction. Accordingly, a liquid filling the inside of the reservoir cylinder can be pressed out from the inside of the reservoir cylinder toward the spray hole and can be sprayed through the spray hole. Therefore, continuous spraying of a liquid can be performed.

Particularly, the displacement curbing portion for curbing displacement of the rear cylinder portion with respect to the vertical supply tube is provided between the rear cylinder portion of the reservoir cylinder and the vertical supply tube. Therefore, for example, even if an external force such as an impact due to a drop or an impact due to contact with the outside acts on the reservoir cylinder, displacement (deformation) of the rear cylinder portion, for example, in the upward/downward direction can be curbed. For example, even if an external force acts on the reservoir cylinder due to a drop impact or the like, by providing the displacement curbing portion, displacement in which the rear cylinder portion is folded in the upward/downward direction starting from a connected portion between the rear cylinder portion and the vertical supply tube due to a rotation torque or the like caused by the external force can be curbed. Accordingly, the rigidity against an unexpected external force can be enhanced, and the impact resistance of the trigger-type liquid sprayer can be improved.

As a result, a high-quality trigger-type liquid sprayer having a high rigidity against a drop impact, a contact impact, and the like can be obtained. Moreover, since the impact resistance can be improved, a larger internal volume (internal capacity) inside the reservoir cylinder can be secured, for example, by forming the rear cylinder portion to extend rearward beyond the vertical supply tube. Accordingly, more liquid can be reserved inside the reservoir cylinder and a trigger-type liquid sprayer suitable for continuous injection can be obtained.

The displacement curbing portion may include a reinforcement rib formed integrally with the vertical supply tube and the rear cylinder portion such that the vertical supply tube and the rear cylinder portion are integrally connected to each other.

In this case, since the vertical supply tube and the rear cylinder portion are integrally connected to each other by the reinforcement rib formed integrally with the vertical supply tube and the rear cylinder portion, the rigidity of the connected portion between the vertical supply tube and the rear cylinder portion can be effectively enhanced. For this reason, even when an external force such as a drop impact or the like acts on the reservoir cylinder, displacement of the rear cylinder portion in the upward/downward direction starting from the connected portion between the rear cylinder portion and the vertical supply tube can be more effectively curbed.

Particularly, it is possible to effectively curb both displacement in which the rear cylinder portion is pressed downward and displacement in which the rear cylinder portion is lifted upward starting from the connected portion between the rear cylinder portion and the vertical supply tube due to an external force acting on the reservoir cylinder.

The displacement curbing portion may include a reinforcement body mounted on the vertical supply tube and the rear cylinder portion, and the reinforcement body may include a first reinforcement body mounted on the vertical supply tube from behind and holding the vertical supply tube, and a second reinforcement body formed integrally with the first reinforcement body, mounted on the rear cylinder portion from below, and holding the rear cylinder portion.

In this case, the entire rigidity can be enhanced by integrally assembling the vertical supply tube and the rear cylinder portion utilizing the reinforcement body provided separately from the vertical supply tube and the rear cylinder portion. Specifically, by mounting the first reinforcement body on the vertical supply tube from behind and mounting the second reinforcement body on the rear cylinder portion from below, the vertical supply tube and the rear cylinder portion are integrally connected to each other utilizing the reinforcement body so that the entire rigidity can be enhanced.

Particularly, since the separately provided reinforcement body is utilized, moldability of the vertical supply tube and the rear cylinder portion is unlikely to be affected, and reinforcement is realized while the performance of spraying a liquid is appropriately maintained, in addition, since the reinforcement body can be arbitrarily designed with a high degree of freedom, it is possible to effectively curb displacement of the rear cylinder portion.

The vertical supply tube may include an outer tube formed integrally with the reservoir cylinder, and an inner tube fitted into the outer tube, an upper rib protruding upward may be formed integrally on an outer circumferential surface of an upper end portion of the reservoir cylinder, the upper rib being positioned on the center axis of the vertical supply tube and extending in the axial direction, the upper rib may include a first wall surface facing the other side in the axial direction and inclined to extend toward one side in the axial direction and upward from the outer circumferential surface of the reservoir cylinder, a first curved surface part may be formed in a connected onion between the first wall surface and the outer circumferential surface of the reservoir cylinder, the first curved surface part being recessed toward one side in the axial direction in a side view of the reservoir cylinder, and the first curved surface part may have a recessed curved surface shape having a curvature radius of 1.5 mm or longer in a side view of the reservoir cylinder.

In this case, when the trigger-type liquid sprayer is assembled, since the upper rib is provided in the reservoir cylinder, the vertical supply tube and the reservoir cylinder can be accurately assembled with favorable setting properties.

That is, since the upper rib is formed on the outer circumferential surface of the upper end portion of the reservoir cylinder such that it is positioned on the center axis of the vertical supply tube, when the inner tube is fitted into the outer tube formed integrally with the reservoir cylinder by plugging or the like, a load transmitted front the inner tube to the reservoir cylinder can be appropriately received utilizing the upper rib.

Therefore, the vertical supply tube and the reservoir cylinder can be accurately assembled with favorable setting properties.

Moreover, the front wall surface of upper rib is an inclined surface inclined toward one side in the axial direction, instead of a vertical surface forming, for example, a right angle with respect to the outer circumferential surface of the reservoir cylinder. In addition to this, the first curved surface part is formed in the connected portion between the front wall surface and the outer circumferential surface of the reservoir cylinder. Accordingly, for example, even if an impact force due to a drop impact or contact with the outside acts on the reservoir cylinder and the reservoir cylinder is displaced such that it is folded in the upward/downward direction due to a rotation torque or the like caused by this, occurrence of a flaw such as cracking in the connected portion between the reservoir cylinder and the front wall surface can be curbed. For example, if the first wall surface is perpendicularly connected to the outer circumferential surface of the reservoir cylinder, when the reservoir cylinder is displaced in the upward/downward direction due to a drop impact or the like, there is a possibility that cracking or the like may occur in the connected portion. On the contrary, since the first wall surface itself is an inclined surface and is connected to the outer circumferential surface of the reservoir cylinder with the first curved surface part therebetween, an impact force can be alleviated, and therefore the foregoing flaw is unlikely to occur.

Moreover, since the first curved surface part has a recessed curved surface shape having a curvature radius of 1.5 mm or longer, even if the reservoir cylinder is displaced in the upward/downward direction due to a drop impact or the like, occurrence of a flaw such as cracking in the connected portion between the reservoir cylinder and the first wall surface can be effectively curbed. When the curvature radius is 2 mm or longer, a greater effect may be exhibited.

From the above, the rigidity against an unexpected external force can be enhanced, and the impact resistance of the trigger-type liquid sprayer can be improved. As a result, a high-quality trigger-type liquid sprayer having high rigidity against a drop impact, a contact impact, or the like can be obtained. Moreover, since the impact resistance can be improved, a larger internal volume (internal capacity) inside the reservoir cylinder can be secured, for example, by forming the reservoir cylinder to extend toward one side in the axial direction beyond the vertical supply tube. Accordingly, more liquid can be reserved inside the reservoir cylinder and a trigger-type liquid sprayer suitable for continuous injection can be obtained.

An inclination angle of the first wall surface with respect to the outer circumferential surface of the reservoir cylinder may be 45 degrees or larger in a side view of the reservoir cylinder.

In this case, since the first wall surface is inclined at an inclination angle of 45 degrees or larger and smaller than 90 degrees with respect to the outer circumferential surface of the reservoir cylinder, the rib height of the upper rib can be secured, and the rigidity of the upper rib can be further enhanced. Therefore, at the time of assembling, a load transmitted from the inner tube to the reservoir cylinder can be more reliably received utilizing the upper rib, and the vertical supply tube and an auxiliary cylinder can be accurately assembled with more favorable setting properties. In addition to this, since the rigidity of the upper rib can be enhanced, occurrence of a flaw such as cracking in the connected portion between the reservoir cylinder and the first wall surface can be effectively curbed.

The upper rib may include a second wall surface facing one side in the axial direction and inclined to extend toward the other side in the axial direction and upward from the outer circumferential surface of the reservoir cylinder, and a second curved surface part may be formed in a connected portion between the second wall surface and the outer circumferential surface of the reservoir cylinder, the second curved surface part being recessed toward the other side in the axial direction in a side view of the reservoir cylinder.

In this case, the upper rib is formed such that both of the first wall surface facing the other side in the axial direction and the second wall surface facing one direction side in the axial direction are inclined surfaces, the first curved surface part is formed between the first wall surface and the outer circumferential surface of the reservoir cylinder, and the second curved surface part is formed between the second wall surface and the outer circumferential surface of the reservoir cylinder. Therefore, for example, even if the reservoir cylinder is displaced to any side in the upward/downward direction due to a drop impact or the like, occurrence of a flaw such as cracking in the upper rib can be more effectively curbed, and the strength of the upper rib against an impact force can be enhanced.

Advantageous Effects of Invention

According to the trigger-type liquid sprayer of the present invention, an impact resistance can be improved.

DESCRIPTION OF EMBODIMENTS

First Embodiment

Hereinafter, a first embodiment of a trigger-type liquid sprayer according to the present invention will be described with reference to FIGS. 1 and 2. In the present embodiment, a spray container in which a trigger-type liquid sprayer is attached to a container body will be described as an example.

Figure 1:
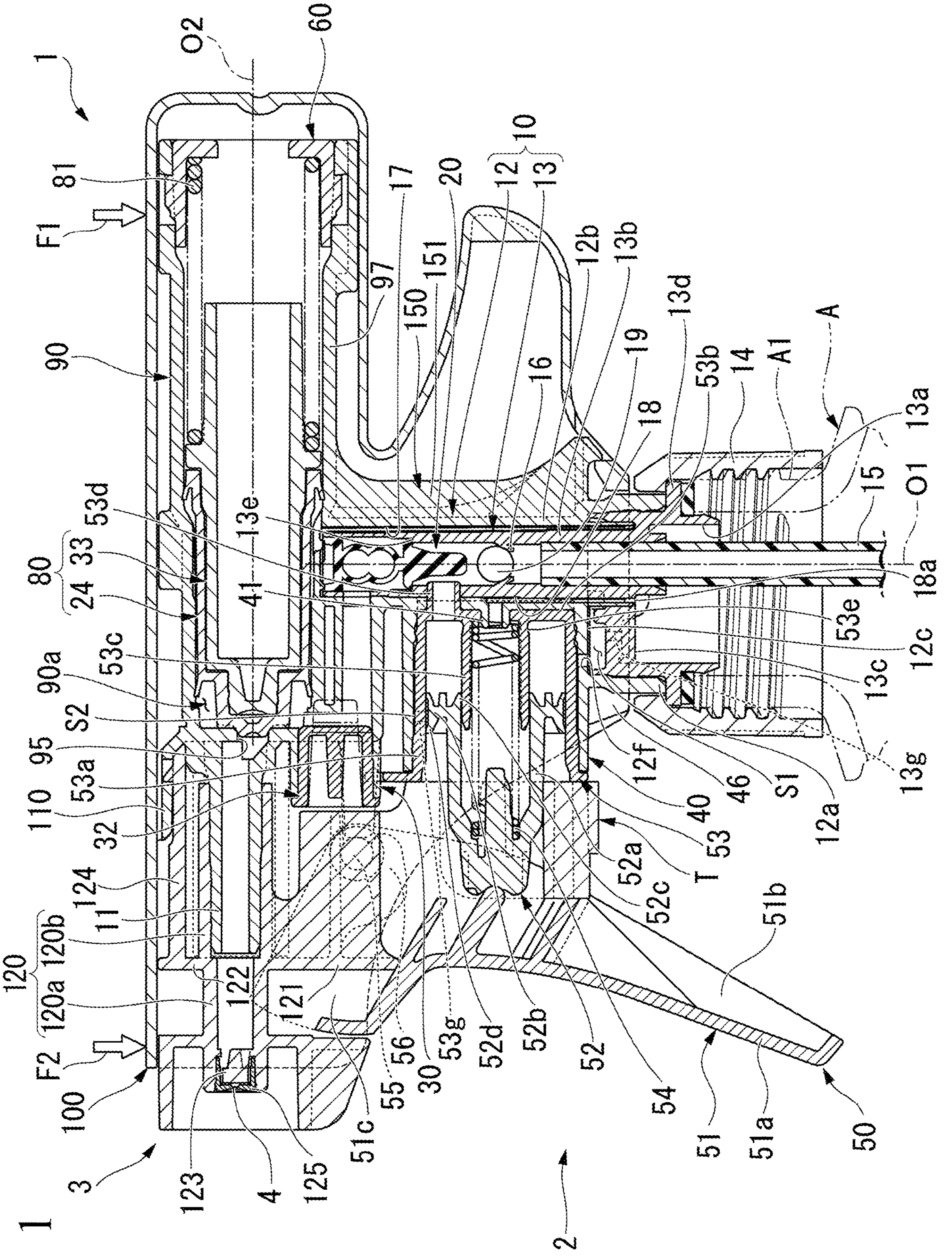
FIG. 1 is a longitudinal cross-sectional view illustrating a first embodiment of a trigger-type liquid sprayer according to the present invention.

As illustrated in FIG. 1, a trigger-type liquid sprayer 1 of the present embodiment includes a sprayer main body 2 which is mounted on a container body A accommodating a liquid therein, and a nozzle member 3 having a spray hole 4 for spraying a liquid and mounted on the sprayer main body 2.

Unless otherwise specified, each constituent component, of the trigger-type liquid sprayer 1 is a molded article using a synthetic resin.

(Sprayer Main Body)

The sprayer main body 2 mainly includes a vertical supply tube 10, a mounting cap 14, an injection tube portion 11, a trigger mechanism 50, a reservoir cylinder 90, a support member 60, a reservoir plunger 80, a bias member 81, a ball valve 19, a reservoir valve 20, and a cover body 100.

In the present embodiment, a center axis of the vertical supply tube 10 will be referred to as an axis O1, a side of the container body A along the axis O1 will be referred to as a lower side, a side opposite thereto will be referred to as an upper side, and a direction along the axis O1 will be referred to as an upward/downward direction. In addition, in a plan view in the upward/downward direction, one direction intersecting the axis O1 will be referred to as a forward/rearward direction, and a direction orthogonal to both of the upward/downward direction and the forward/rearward direction will be referred to as a leftward/rightward direction.

Moreover, in the present embodiment, a center axis of the reservoir cylinder 90 will be regarded as an axis O2. In the present embodiment, the axis O2 extends in the forward/rearward direction. Therefore, in the present embodiment, the forward/rearward direction corresponds to an axial direction along the center axis (if the reservoir cylinder 90.

In addition, in the present embodiment, a rear side corresponds to one side in the axial direction along the center axis of the reservoir cylinder 90, and a front side corresponds to the other side in the axial direction along the center axis of the reservoir cylinder 90. However, the axial direction along the axis O2 may not coincide with the forward/rearward direction.

The vertical supply tube 10 extends in the upward/downward direction and sucks up a liquid inside the container body A. The vertical supply tube 10 has an outer tube 12 having a topped cylindrical shape, and an inner tube 13 fitted into the outer tube 12. The axis O1 of the vertical supply tube 10 constituted of the outer tube 12 and the inner tube 13 is positioned behind a container axis of the container body A.

The outer tube 12 has a large diameter portion 12*a*, a small diameter portion 12*b* disposed above the large diameter portion 12*a* and having a diameter smaller than the large diameter portion 12*a*, and an annular connection portion 12*c* connecting an upper end portion of the large diameter portion 12*a* and a lower end portion of the small diameter portion 12*b* to each other.

The upper end portion of the large diameter portion 12*a* has a diameter smaller than a part of the large diameter portion 12*a* positioned below the upper end portion. Therefore, an outer circumferential surface of the upper end portion of the large diameter portion 12*a* is recessed throughout the entire circumference of the large diameter portion 12*a*, and no projection rib or the like is provided thereon. The small diameter portion 12*b* has a topped cylindrical shape and is located coaxially with the axis O1. As illustrated in FIG. 2, a top wall portion 12*d* of the small diameter portion 12*b* is formed integrally with the reservoir cylinder 90. Accordingly, the outer tube 12 of the vertical supply tube 10 is formed integrally with the reservoir cylinder 90.

As illustrated in FIG. 1, the inner tube 13 has a large diameter portion 13*a*, a small diameter portion 13*b* disposed above the large diameter portion 13*a* and having a diameter smaller than the large diameter portion 13*a*, and an annular connection portion 13*c* connecting an upper end portion of the large diameter portion 13*a* and a lower part of the small diameter portion 13*b* to each other. The small diameter portion 13*b* is disposed radially inside the large diameter portion 13*a*. The annular connection portion 13*c* connects an inner circumferential surface of the large diameter portion 13*a* and an outer circumferential surface of the small diameter portion 13*b* to each other in the radial direction.

The large diameter portion 13*a* is located inside the large diameter portion 12*a* of the outer tube 12. The upper end portion of the large diameter portion 13*a* is fitted into the upper end portion of the large diameter portion 12*a* of the outer tube 12. The upper end portion of the large diameter portion 13*a* comes into surface-contact with an inner circumferential surface of the large diameter portion 12*a* of the outer tube 12 throughout the entire circumference. Accordingly, a part between an outer circumferential surface of the upper end portion of the large diameter portion 13*a* and the inner circumferential surface of the upper end portion of the large diameter portion 12*a* of the outer tube 12 is sealed (so-called surface sealing) throughout the entire circumference.

A lower end portion of the large diameter portion 13*a* protrudes downward from the large diameter portion 12*a* of the outer tube 12. The lower end portion of the large diameter portion 13*a* is fitted into a mouth portion A1 of the container body A. An annular rim portion 13*d* protruding outward in the radial direction of the large diameter portion 13*a* is formed on a part of the large diameter portion 13*a* protruding downward from the large diameter portion 12*a* of the outer tube 12. The rim portion 13*d* is located inside an upper end portion of the mounting cap 14 mounted (for example, screwed) on the mouth portion A1 of the container body A and interlocks the upper end portion of the mounting cap 14 so as to be rotatable around the axis thereof. The rim portion 13*d* is interposed between the upper end portion of the mounting cap 14 and an upper end opening edge of the mouth portion A1 of the container body A in the upward/downward direction.

The small diameter portion 13*b* is located coaxially with the axis O1 and has a cylindrical shape opening on both sides in the upward/downward direction. The small diameter portion 13*b* is located inside, the small diameter portion 12*b* of the outer tube 12. An upper end opening edge of the small diameter portion 13*b* is slightly separated downward from the top wall portion 12*d* of the outer tube 12. An upper portion of a pipe 15 extending in the upward/downward direction and sucking up a liquid from the container body A is fitted into the lower part of the small diameter portion 13*b*. A lower opening section of the pipe 15 is positioned in a bottom portion (not illustrated) of the container body A.

A gap S1 in the upward/downward direction is provided between an upper surface of the annular connection portion 13*c* and a lower surface of the annular connection portion 12*c* of the outer tube 12.

Figure 2:
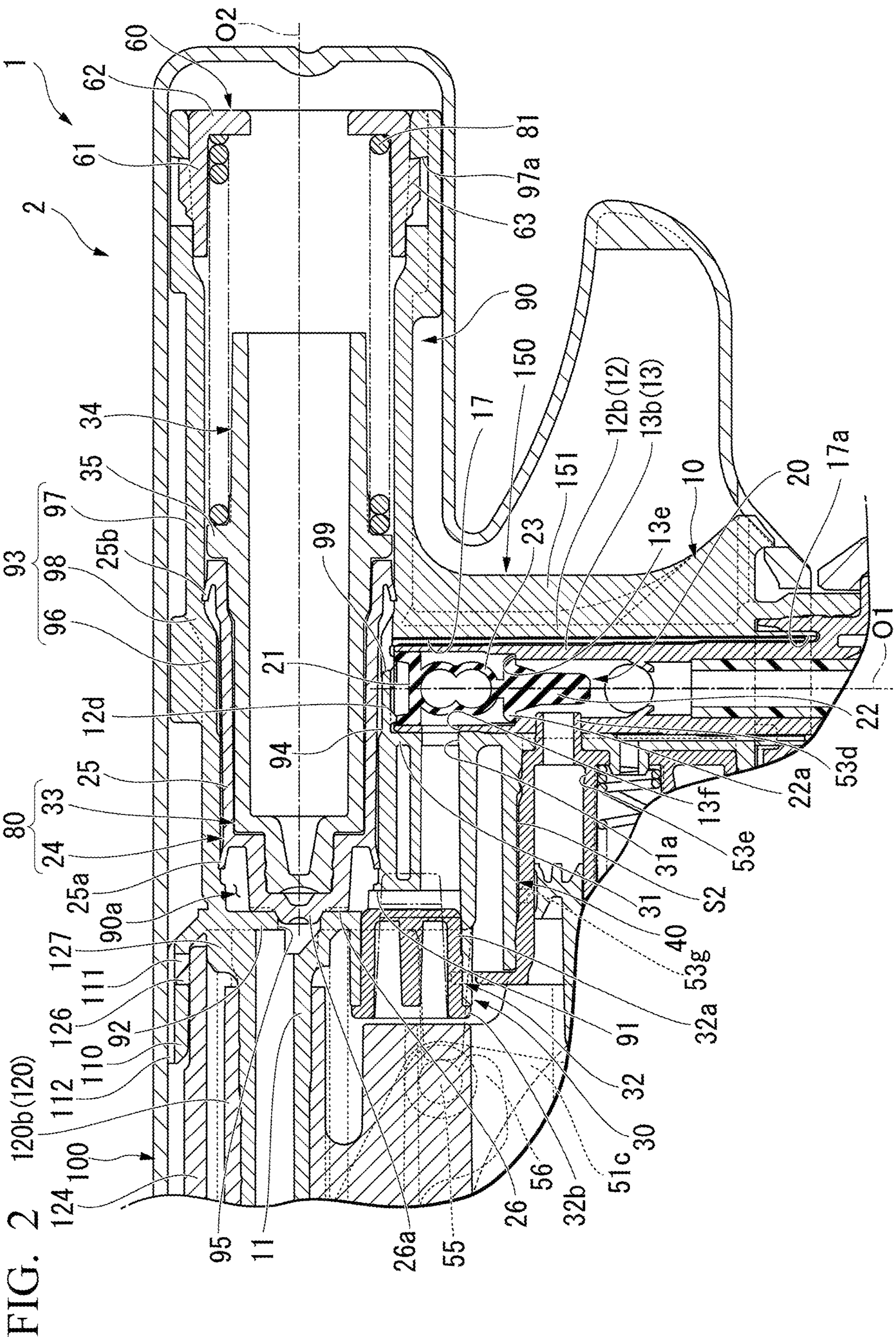
FIG. 2 is an enlarged longitudinal cross-sectional view of a periphery of a reservoir plunger of the trigger-type liquid sprayer illustrated in FIG. 1.

As illustrated in FIG. 2, a valve seat portion 13*e* is formed on the inner circumferential surface of the inner tube 13. In the illustrated example, the valve seat portion 13*e* is formed by a step obtained by making the inner diameter of a part of the inner tube 13 positioned above the valve seat portion 13*e* larger than the inner diameter of a part of the inner tube 13 positioned below the valve seat portion 13$e$. The reservoir valve 20 is seated on an upper surface of the valve seat portion 3$e$.

As illustrated in FIG. 1, a support tube portion 16 having a cylindrical shape is provided on a part of the inner circumferential surface of the inner tube 13 positioned below the valve seat portion 13$e$ and above the upper end portion of the pipe 15. The outer diameter of the support tube portion 16 is smaller than the inner diameter of the inner tube 13. The support tube portion 16 is located coaxially with the axis O1 and protrudes upward from the inner circumferential surface of the inner tube 13. The ball valve 19 is disposed on an upper end opening edge of the support tube portion 16 so as to be separable upward from the upper end opening edge.

A recovery path 17 is provided between the outer tube 12 and the inner tube 13 and positioned behind the axis O1. The recovery path 17 extends in the upward/downward direction and opens upward, and a downward side of the recovery path 17 is closed. That is, the recovery path 17 does not open downward.

Specifically, the recovery path 17 is a vertical groove formed on the inner circumferential surface of the small diameter portion 12$b$ of the outer tube 12. The recovery path 17 is provided in the small diameter portion 12$b$ throughout the overall length in the upward/downward direction. A lower end portion of the recovery path 17 is closed from below by the annular connection portion 13$c$ of the inner tube 13. The lower end portion of the recovery path 17 communicates with a connection path 18 (which will be described below) through communication paths 17$a$ (refer to FIG. 2) and communicates with the inside of the container body A through a communication opening 18$a$.

For example, the recovery path 17 may be a vertical groove formed on the outer circumferential surface of the inner tube 13. Moreover, the recovery path 17 may be formed by combining vertical grooves respectively formed in the outer tube 12 and the inner tube 13.

The communication paths 17$a$ are provided between the outer tube 12 and the inner tube 13. The communication paths 17$a$ extend in a circumferential direction of the vertical supply tube 10 from the recovery path 17 and allow the recovery path 17 and the connection path 18 (which will be described below) to communicate with each other and. The communication paths 17$a$ extend forward from the lower end portion of the recovery path 17 and are connected to the connection path 18. For example, the communication path 17$a$ has a circular arc shape. Two communication paths 17$a$ are provided with the axis O1 interposed therebetween in the radial direction.

The communication paths 17$a$ are circumferential grooves formed on the inner circumferential surface of the small diameter portion 12$b$ of the outer tube 12 and extending in the circumferential direction. For example, the communication paths 17$a$ may be circumferential grooves formed on the inner circumferential surface of the inner tube 13. Moreover, the communication paths 17$a$ may be formed by combining circumferential grooves respectively formed in the outer tube 12 and the inner tube 13.

The communication paths 17$a$ communicate with the inside of the container body A through the communication opening 18$a$ (which will be described below). The communication paths 17$a$ do not open downward (toward the inside of the container body A) at a part other than the communication opening 18$a$.

As illustrated in FIGS. 1 and 2, a connection tube portion 30 extending forward is provided in an upper end portion of the vertical supply tube 10.

The connection tube portion 30 has a bottomed cylindrical shape opening forward and having a rear side closed. A bottom portion 31 of the connection tube portion 30 is formed integrally with the upper end portion of the outer tube 12. A penetration hole 31$a$ penetrating the bottom portion 31 in the forward/rearward direction is formed in the bottom portion 31.

The penetration hole 31$a$ opens toward a penetration hole 13$f$ formed in the upper end portion of the inner tube 13. The penetration hole 13$f$ is formed in a part of the small diameter portion 13$b$ positioned above the valve seat portion 13$e$ in the inner tube 13. Accordingly, the inside of the connection tube portion 30 communicates with the inside of a part of the inner tube 13 positioned above the valve seat portion 13$e$ through the penetration hole 31$a$ and the penetration hole 13$f$.

The inner diameter of the connection tube portion 30 is equal to or larger than the inner diameter of the inner tube 13. In addition, a closing plug 32 is tightly fitted into a front end portion of the connection tube portion 30.

The closing plug 32 includes a plug main body 32$a$ and a flange portion 32$b$.

The plug main body 32$a$ has a bottomed cylindrical shape opening forward and having a rear side closed and is tightly fitted into the front end portion of the connection tube portion 30. Accordingly, the closing plug 32 closes a front opening section of the connection tube portion 30.

The flange portion 32$b$ projects outward from a front end opening edge of the plug main body 32$a$. The flange portion 32$b$ abuts a front end opening edge of the connection tube portion 30 from the front when the plug main body 32$a$ is mounted on the connection tube portion 30.

As illustrated in FIG. 1, a tube portion 40 for a cylinder is provided below the connection tube portion 30.

The tube portion 40 for a cylinder protrudes forward from the small diameter portion 12$b$ of the outer tube 12 and opens forward. A war part of a lower end portion of the tube portion 40 for a cylinder is formed integrally with the annular connection portion 12$c$ of the outer tube 12.

For example, lower ribs 46 are provided around the tube portion 40 for a cylinder.

The lower ribs 46 are formed to be laid across the tube portion 40 for a cylinder and the large diameter portion 12$a$. For example, the lower ribs 46 are provided at positions avoiding a part immediately below the tube portion 40 for a cylinder. A pair of lower ribs 46 are provided with an interval therebetween in a circumferential direction around an axis of the tube portion 40 for a cylinder. An upper end of each of the lower ribs 46 is connected to an outer circumferential surface of the tube portion 40 for a cylinder, and a rear end of each of the lower ribs 46 is connected to the outer circumferential surface of the large diameter portion 12$a$. The lower ribs 46 may be provided immediately below the tube portion 40 for a cylinder.

A fitting tube portion 41 protruding forward from the small diameter portion 12$b$ of the outer tube 12 and opening forward is provided inside the tube portion 40 for a cylinder.

The fitting tube portion 41 is located coaxially with the tube portion 40 for a cylinder. A front end portion of the fitting tube portion 41 is positioned behind a front end portion of the tube portion 40 for a cylinder.

The connection path 18 extending in the upward/downward direction is formed between the inner circumferential surface of the outer tube 12 and the outer circumferential surface of the inner tube 13. The connection path 18 is separated from the recovery path 17 around the axis O1 and is positioned in front of the recovery path 17 and the axis O1. Specifically, the connection path 18 is disposed in a front end portion of the vertical supply tube 10.

An upper end portion of the connection path 18 is positioned behind the fitting tube portion 41. A lower end portion of the connection path 18 communicates with the inside of the container body A through the communication opening 18*a* formed in the annular connection portion 13*c* of the inner tube 13.

Accordingly, the connection path 18 allows the inside of the fitting tube portion 41 and the inside of the container body A to communicate with each other through the communication opening 18*a* and the inside of the large diameter portion 13*a*. The connection path 18 functions as a residual pressure release path for discharging air inside a main cylinder 53. Moreover, the recovery path 17 communicates with the inside of the container body A through the communication paths 17*a*, the connection path 18, and the communication opening 18*a*.

For example, the connection path 18 may be formed by a vertical groove formed on the outer circumferential surface of the inner tube 13 or may be formed by combining vertical grooves respectively formed in the outer tube 12 and the inner tube 13.

The injection tube portion 11 extends in the forward/rearward direction and communicates with the inside of the vertical supply tube 10 through the inside of the reservoir cylinder 90 and the inside of the connection tube portion 30. The injection tube portion 11 extends forward from a front wall portion 92 of the reservoir cylinder 90 and guides a liquid that has passed through the inside of the vertical supply tube 10 and the inside of the connection tube portion 30 to the spray hole 4. The center axis of the injection tube portion 11 is disposed parallel to the axis O2. In the illustrated example, the center axis of the injection tube portion 11 is positioned above the axis O2 of the reservoir cylinder 90.

The trigger mechanism 50 includes a trigger portion 51, the main cylinder 53, a main piston 52, and a coil spring (bias member) 54. The trigger mechanism 50 is configured to cause a liquid to flow from the inside of the vertical supply tube 10 toward the spray hole 4 in response to a rearward swing of the trigger portion 51.

The trigger portion 51 is disposed in front of the vertical supply tube 10 and configured to be movable rearward in a state in which the trigger portion 51 is biased forward. The trigger portion 51 is formed to extend in the upward/downward direction and is disposed below the injection tube portion 11.

An upper end portion of the trigger portion 51 is pivotally supported by the nozzle member 3 such that the trigger portion 51 is swingable in the forward/rearward direction. Specifically, the trigger portion 51 includes a main plate member 51*a* having a front surface curved in a shape recessed rearward in a side view in the leftward/rightward direction, and a pair of side plate members 51*b* standing up rearward from left and right side edge portions of the main plate member 51*a*.

A pair of connection plates 51*c* are formed in upper end portions of the pair of side plate members 51*b*, the pair of connection plates 51*c* extending upward to reach lateral portions of the nozzle member 3 and sandwiching the nozzle member 3 therebetween in the leftward/rightward direction. Rotary shaft portions 55 protruding outward in the leftward/rightward direction are provided on the pair of connecting plates 51*c*. The rotary shaft portions 55 are rotatably supported by bearing portions 56 provided on the lateral portions of the nozzle member 3.

Accordingly, the trigger portion 51 is supported to be swingable in the forward/rearward direction about the rotary shaft portions 55.

As illustrated in FIGS. 1 and 2, the main cylinder 53 is disposed behind the trigger portion 51 and faces the trigger portion 51 in the forward/rearward direction. The main cylinder 53 has an outer tube portion 53*a* opening forward, a rear wall portion 53*b* closing a rear end opening of the outer tube portion 53*a*, a tubular piston guide 53*c* protruding forward from a center part of the rear wall portion 53*b*, and a tubular communication tube portion 53*d* protruding rearward from a part of the rear wall portion 53*b* positioned above the piston guide 53*c* and opening on both sides in the forward/rearward direction.

The outer tube portion 53*a* is disposed coaxially with the tube portion 40 for a cylinder and is fitted into the tube portion 40 for a cylinder. An inner circumferential surface of the tube portion 40 for a cylinder and an outer circumferential surface of the outer tube portion 53*a* are in tight-contact with each other in both end portions in the forward/rearward direction. An annular gap S2 is provided between the inner circumferential surface of the tube portion 40 for a cylinder and the outer circumferential surface of the outer tube portion 53*a*, the annular gap S2 being positioned in an intermediate portion between the above described both end portions in the forward/rearward direction.

A first vent hole 53*g* allowing the inside of the outer tube portion 53*a* and the gap S2 to communicate with each other is formed in the outer tube portion 53*a*. As illustrated in FIG. 1, a second vent hole 12*f* allowing the gap S2 and the gap S1 between the annular connection portion 12*c* of the outer tube 12 and the annular connection portion 13*c* of the inner tube 13 to communicate with each other is formed in the annular connection portion 12*c* of the outer tube 12. Moreover, a third vent hole 13*g* allowing the gap S1 and the inside of the mounting cap 14 to communicate with each other is formed in the annular connection portion 3*c* of the inner tube 13.

The communication tube portion 53*d* is fitted into the penetration holes formed in the outer tube 12 and the inner tube 13. The inside of the inner tube 13 of the vertical supply tube 10 and the inside of the main cylinder 53 communicate with each other through the inside of the communication tube portion 53*d*. A war end portion of the communication tube portion 53*d* protrudes into the inner tube 13.

The penetration hole of the inner tube 13 into which the communication tube portion 53*d* is fitted opens in a part of the small diameter portion 13*b* of the inner tube 13 positioned between the valve seat portion 13*e* and the support tube portion 16. Therefore, the ball valve 19 separably seated on the upper end opening edge of the support tube portion 16 can switch to bring the inside of the container body A and the inside of the main cylinder 53 in communication with each other and block the communication.

The ball valve 19 is a check valve blocking communication between the inside of the container body A and the inside of the main cylinder 53 through the inside of the vertical supply tube 10 when the inside of the main cylinder 53 is compressed, and allowing communication between the inside of the container body A and the inside of the main cylinder 53 through the inside of the vertical supply tube 10 by being displaced upward when the inside of the main cylinder 53 is decompressed.

Since the reservoir valve 20 is disposed above the ball valve 19, excessive upward displacement of the ball valve 19 is restricted by the reservoir valve 20. Excessive upward displacement of the ball valve 19 may be restricted by the rear end portion of the communication tube portion 53*d*.

The piston guide 53*c* has a bottomed cylindrical shape opening forward and having a rear side closed and is disposed inside the outer tube portion 53*a*. A front end portion of the piston guide 53*c* is positioned behind a front end portion of the outer tube portion 53*a*. A bottom portion of the piston guide 53*c* has an annular shape, and the fitting tube portion 41 is fitted into the bottom portion. The front end portion of the fitting tube portion 41 protrudes into the piston guide 53*c*.

The piston guide 53*c* is located coaxially with the fitting tube portion 41. An annular recessed portion 53*e* is formed on an outer circumferential surface of a rear end portion of the piston guide 53*c*.

The main piston 52 is disposed inside the main cylinder 53 and configured to be movable in the forward/rearward direction, and is moved in the forward/rearward direction in association with a swing of the trigger portion 51. The inside of the main cylinder 53 is compressed and decompressed in response to movement of the main piston 52 in the forward/rearward direction.

The main piston 52 has a topped cylindrical shape opening rearward and having a front side closed and is located coaxially with the main cylinder 53. The main piston 52 is interlocked with an intermediate portion of the trigger portion 51 in the upward/downward direction.

The main piston 52 is biased forward together with the trigger portion 51 due to a biasing force of the coil spring 54. The main piston 52 moves rearward in response to a rearward swing of the trigger portion 51 and is thrust into the main cylinder 53.

The main piston 52 has a piston main body portion 52*a* which opens rearward and into which the piston guide 53*c* is inserted, and a sliding tube portion 52*b* which protrudes outward in the radial direction of the piston main body portion 52*a* from a rear end portion of the piston main body portion 52*a* and comes into sliding-contact with an inner circumferential surface of the outer tube portion 53*a*.

The piston main body portion 52*a* has a topped cylindrical shape opening rearward and having a front side closed. The inner diameter of the piston main body portion 52*a* is slightly larger than the outer diameter of the piston guide 53*c*. A front end portion of the piston main body portion 52*a* abuts the trigger portion 51 from behind and is interlocked with the trigger portion 51.

An annular inner lip portion 52*c* protruding inward in the radial direction of the piston main body portion 52*a* and coming into sliding-contact with an outer circumferential surface of the piston guide 53*c* is formed in the rear end portion of the piston main body portion 52*a*. Accordingly, sealability is secured between the inner lip portion 52*c* and the outer circumferential surface of the piston guide 53*c*.

When the main piston 52 moves rearward and the inner lip portion 52*c* reaches the recessed portion 53*e* of the piston guide 53*c*, a slight gap is formed between the inner lip portion 52*c* and the recessed portion 53*e*. Through this gap, the inside of the outer tube portion 53*a* of the main cylinder 53 communicates with a gap between an inner circumferential surface of the piston main body portion 52*a* and the outer circumferential surface of the piston guide 53*c*. Accordingly, the inside of the outer tube portion 53*a* communicates with the inside of the fitting tube portion 41 through the inside of the piston guide 53*c*.

The inner lip portion 52*c* reaches the recessed portion 53*e* when the main piston 52 is positioned at the rearmost position.

The sliding tube portion 52*b* has a diameter that is increased forward and rearward from a central portion in the forward/rearward direction. The sliding tube portion 52*b* has outer lip portions 52*d* positioned in both end portions thereof in the forward/rearward direction. The outer lip portions 52*d* conic into tight sliding-contact with the inner circumferential surface of the outer tube portion 53*a*. Accordingly, sealability is secured between the outer lip portions 52*d* and the inner circumferential surface of the outer tube portion 53*a*.

When the trigger portion 51 is at the foremost swing position, the main piston 52 is positioned at the foremost position corresponding thereto. At this time, the sliding tube portion 52*b* closes the first vent hole 53*g* formed in the outer tube portion 53*a*.

Further, when the main piston 52 moves rearward from the foremost position by a predetermined amount in response to a rearward swing of the trigger portion 51, the sliding tube portion 52*b* opens the first vent hole 53*g*. Accordingly, the first vent hole 53*g* is opened to the outside of the trigger-type liquid sprayer 1 through the inside of the outer tube portion 53*a*.

According to this, the inside of the container body A can communicate with the outside of the trigger-type liquid sprayer 1 through the third vent hole 13*g* formed in the annular connection portion 13*c* of the inner tube 13, the gap S1, the second vent hole 12*f*, the gap S2, and the first vent hole 53*g*.

The coil spring (bias member) 54 is made of a metal, is located coaxially with the main piston 52 and the main cylinder 53, and biases the trigger portion 51 forward via the main piston 52.

The coil spring 54 is disposed to straddle the inside of the piston guide 53*c* and the inside of the piston main body portion 52*a*. A rear end portion of the coil spring 54 is supported by the bottom portion (rear wall portion 53*b*) of the piston guide 53*c* in a state of surrounding the front end portion of the fitting tube portion 41. A front end portion of the coil spring 54 is supported by a stepped surface which is formed inside the piston main body portion 52*a* and faces the rear side.

A material of the coil spring 54 is not limited to a metal, and a resin spring or the like may be employed, for example.

A stopper T is provided in a gap in the forward/rearward direction between the trigger portion 51 and the main cylinder 53 in an attachable/detachable manner.

The stopper T is a restriction member restricting a rearward swing of the trigger portion 51 by abutting the trigger portion 51 and the main cylinder 53. A user may discard the detached stopper T or may reattach the stopper T after using the trigger-type liquid sprayer 1 to restrict a rearward swing of the trigger portion 51.

As illustrated in FIGS. 1 and 2, the reservoir cylinder 90 is disposed above the vertical supply tube 10 and the connection tube portion 30. A liquid that has passed through the inside of the vertical supply tube 10 and the inside of the connection tube portion 30 is supplied to the inside of the reservoir cylinder 90 in response to a rearward swing of the trigger portion 51. The reservoir cylinder 90 extends in the forward/rearward direction to straddle the vertical supply tube 10 in the forward/rearward direction and is disposed substantially parallel to the connection tube portion 30 and the tube portion 40 for a cylinder in the illustrated example. A lower end portion of the reservoir cylinder 90 is formed integrally with the upper end portion of the vertical supply tube 10 and an upper end portion of the connection tube portion 30.

The reservoir cylinder 90 includes the front wall portion 92 positioned at the front end and a cylinder tube 93 extending rearward from the front wall portion 92, and the entirety of the reservoir cylinder 90 has a topped cylindrical shape opening rearward and having a front side closed.

The front wall portion 92 protrudes upward from an intermediate pan of the connection tube portion 30 in the forward/rearward direction. A communication hole 95 penetrating the front wall portion 92 in the forward/rearward direction is formed in the front wall portion 92. The communication hole 95 has a circular shape and is located coaxially with the axis O2. Accordingly, a storage space 90*a* (which will be described below) inside the reservoir cylinder 90 and the inside of the injection tube portion 11, which communicates with the spray hole 4, communicate with each other through the communication hole 95. The communication hole 95 may be formed in the cylinder tube 93.

The cylinder tube 93 has a front tube portion 96 extending rearward from the front wall portion 92, a rear tube portion 97 having an outer diameter and an inner diameter larger than those of the front tube portion 96 and positioned behind the front tube portion 96, and a stepped portion 98 connecting the front tube portion 96 and the rear tube portion 97 to each other in the forward/rearward direction.

The stepped portion 98 has a diameter that is increased rearward from the front. The top wall portion 12*d* of the outer tube 12 is connected to a connected portion between the front tube portion 96 and the stepped portion 98. More specifically, the top wall portion 12*d* of the outer tube 12 is connected to a part, of the connected portion between the front tube portion 96 and the stepped portion 98, positioned at a lower part of the cylinder tube 93.

The rear tube portion 97 is positioned behind the vertical supply tube 10. For this reason, the rear tube portion 97 functions as a rear cylinder portion protruding rearward beyond the vertical supply tube 10 in the reservoir cylinder 90. The rear tube portion 97 is formed integrally with the upper end portion of the vertical supply tube 10.

Moreover, a supply hole 91, communication grooves 94, and a recovery hole 99 are formed in the reservoir cylinder 90.

The supply hole 91 is formed at a lower part of the front end portion of the front tube portion 96 and opens in a part of the connection tube portion 30 positioned behind the plug main body 32*a*. Accordingly, a liquid that has passed through the inside of the vertical supply tube 10 and the inside of the connection tube portion 30 is supplied to the inside of the reservoir cylinder 90 through the supply hole 91.

The communication grooves 94 are formed on an inner circumferential surface of a rear portion of the front tube portion 96. A plurality of communication grooves 94 are disposed with an interval therebetween around the axis O2.

The recovery hole 99 penetrates the connected portion between the front tube portion 96 and the stepped portion 98 and the top wall portion 12*d* of the outer tube 12, which are integrally formed, in the upward/downward direction. The recovery hole 99 opens toward an upper end portion of the recovery path 17 provided in the vertical supply tube 10. Accordingly, the recovery hole 99 communicates with the inside of the container body A through the recovery path 17. A rear end portion of the communication groove 94 of the plurality of communication grooves 94 positioned on the lower side opens in a front end portion of the recovery hole 99.

The support member 60 is fixed to a rear end portion of the reservoir cylinder 90 and is located coaxially with the axis O2. The support member 60 includes a support wall portion 62 positioned at the rear end and a fixed tube portion 61 extending forward from the support wall portion 62, and the entirety of the support member 60 has a bottomed cylindrical shape opening forward and having, a rear side closed.

The fixed tube portion 61 is fitted into the rear end portion of the reservoir cylinder 90 in a state in which rearward movement and rotative movement around the axis O2 are restricted. The support wall portion 62 has an annular shape. The inside of a part of the reservoir cylinder 90 positioned behind the reservoir plunger 80 communicates with the outside through the inside of the support wall portion 62.

Interlock protrusions 63 protruding forward are formed in the support wall portion 62. A plurality of interlock protrusions 63 are provided with an interval therebetween around the axis O2 and are interlocked with the inside of interlock recesses 97*a* formed in the rear tube portion 97 from the front. Accordingly, rearward detachment of the fixed tube portion 61 from the reservoir cylinder 90 is restricted.

The reservoir plunger 80 is disposed inside the reservoir cylinder 90 and configured to be movable in the forward/rearward direction along the axis O2. The reservoir plunger 80 moves rearward in response to supply of a liquid to the inside of the reservoir cylinder 90. The reservoir plunger 80 blocks communication between the inside of the vertical supply tube 10 and the spray hole 4 through the communication hole 95, and when the reservoir plunger 80 moves rearward, the reservoir plunger 80 allows the inside of the vertical supply tube 10 and the spray hole 4 to communicate with each other through the communication hole 95.

The reservoir plunger 80 has a slide member 24 sliding inside the reservoir cylinder 90 in the forward/rearward direction, and a reception member 33 fitted into the slide member 24. The slide member 24 and the reception member 33 have a tubular shape extending in the forward/rearward direction and are located coaxially with the axis O2.

For example, the slide member 24 is formed of a material softer than those of the reception member 33 and the reservoir cylinder 90 and has a plunger tube 25 extending in the forward/rearward direction and a closing wall 26 closing a front end opening of the plunger tube 25.

A front lip portion 25*a* and a rear lip portion 25*b* are formed on an outer circumferential surface of the plunger tube 25 throughout the whole circumference.

The front lip portion 25*a* closely slides on an inner circumferential surface of the front tube portion 96 of the cylinder tube 93 in the forward/rearward direction. Accordingly, sealability is secured between the front lip portion 25*a* and the inner circumferential surface of the front tube portion 96.

Specifically, the front lip portion 25*a* has a cylindrical shape protruding forward from the outer circumferential surface of the plunger tube 25. A gap is provided between an inner circumferential surface of the front lip portion 25*a* and an outer circumferential surface of the front end portion of the plunger tube 25. Moreover, the front end portion of the plunger tube 25 positioned in front of the front lip portion 25*a* has a diameter smaller than a part of the plunger tube 25 positioned behind the front end portion. A gap is provided between the outer circumferential surface of the front end portion of the plunger tube 25 and an inner circumferential surface of the reservoir cylinder 90.

Further, the inside of the front lip portion 25*a* and the supply hole 91 formed in the reservoir cylinder 90 open in this gap. Therefore, this gap functions as the storage space 90*a* storing a liquid that has passed through the inside of the vertical supply tube 10 and expanding when the reservoir plunger 80 moves rearward in response to supply of the liquid.

The rear lip portion 25*b* closely slides on an inner circumferential surface of the rear tube portion 97 of the cylinder tube 93 in the forward/rearward direction. Accordingly, scalability is secured between the rear lip portion 25*b* and the inner circumferential surface of the rear tube portion 97. The rear lip portion 25*b* has a cylindrical shape protruding forward from an outer circumferential edge of a rear end of the plunger tube 25. A gap is provided between an inner circumferential surface of the rear lip portion 25*b* and the outer circumferential surface of the rear end portion of the plunger tube 25.

The closing wall 26 is pressed against a rear surface of the front wall portion 92 of the reservoir cylinder 90, more specifically, against a pal of the rear surface positioned around an opening circumferential edge portion of the communication hole 95. A protrusion portion 26*a* protruding forward is formed on a front surface of the closing wall 26.

The protrusion portion 26*a* has a truncated cone shape located coaxially with the axis O2. The protrusion portion 26*a* has an outer diameter that is decreased forward from the rear. Accordingly, the communication hole 95 is closed when an outer circumferential surface of the protrusion portion 26*a* abuts an inner surface of a rear end portion of the communication hole 95.

The reception member 33 includes a reception tube 34 and a reception seat portion 35.

The reception tube 34 has a topped cylindrical shape opening rearward and having a front side closed and is disposed inside the plunger tube 25. A rear part of the reception tube 34 protrudes rearward from a rear opening section of the plunger tube 25 and is disposed inside the rear tube portion 97 of the cylinder tube 93. The outer diameter of the reception tube 34 is smaller than the inner diameter of the rear tube portion 97. Accordingly, an annular gap is provided between an outer circumferential surface of the rear part of the reception tube 34 and the inner circumferential surface of the rear tube portion 97. Further, the front part of the bias member 81 is disposed in this gap.

The reception seat portion 35 has a flange shape protruding from the outer circumferential surface of the rear part of the reception tube 34. A front surface of the reception seat portion 35 abuts or approaches the rear end opening edge of the plunger tube 25.

The bias member 81 biases the reservoir plunger 80 forward. The bias member 81 surrounds the rear part of the reception tube 34 and is disposed between the reception seat portion 35 and the support wall portion 62 of the support member 60 in a state of being compressed in the forward/rearward direction. Accordingly, a front end edge of the bias member 81 abuts a rear surface of the reception seat portion 35, and a rear end edge of the bias member 81 abuts a front surface of the support wall portion 62.

The bias member 81 is a metal coil spring located coaxially with the axis O2. However, it is not limited to this case. For example, a resin spring may be used or other members having elasticity may be used as the bias member 81.

When the reservoir plunger 80 moves rearward against the bias member 81 and the closing wall 26 is separated rearward from the front wall portion 92 of the reservoir cylinder 90, the communication hole 95 is opened. A liquid in the storage space 90*a* of the reservoir cylinder 90 is compressed until the reservoir plunger 80 moves rearward. When the liquid pressure in the storage space 90*a* reaches a predetermined value, the reservoir plunger 80 moves rearward against the bias member 81. Accordingly, a liquid in the storage space 90*a* can be supplied to the spray hole 4 side through the communication hole 95. Therefore, the reservoir plunger 80 functions as an accumulator valve.

The reservoir valve 20 is provided inside the inner tube 13 of the vertical supply tube 10.

The reservoir valve 20 is a check valve allowing supply of a liquid to the inside of the reservoir cylinder 90 from the inside of the vertical supply tube 10 and restricting outflow of a liquid to the inside of the vertical supply tube 10 from the inside of the reservoir cylinder 90. Specifically, the reservoir valve 20 has a fixed portion 21 fixed inside the upper end portion of the inner tube 13, a valve body portion 22 disposed on the upper surface of the valve seat portion 13*e*, and an elastic deformation portion 23 connecting the fixed portion 21 and the valve body portion 22 to each other.

The fixed portion 21 has a disk shape and is tightly fitted into the upper end portion of the inner tube 13.

The valve body portion 22 has a pillar shape extending in the upward/downward direction and faces a rear end opening of the communication tube portion 53*d* in the forward/rearward direction. A lower end surface of the valve body portion 22 faces the ball valve 19 in the upward/downward direction.

A flange-shaped valve plate portion 22*a* is formed on a part of an outer circumferential surface of the valve body portion 22 positioned above the communication tube portion 53*d*, and disposed on the upper surface of the valve seat portion 13*e* so as to be separable upward from the upper surface. The elastic deformation portion 23 is elastically deformable in the upward/downward direction. When the inside of the main cylinder 53 is compressed, the elastic deformation portion 23 is compressively deformed upward due to upward displacement of the valve body portion 22. Thus, the valve plate portion 22*a* is separated upward from the valve seat portion 13*e* so as to allow supply of a liquid into the reservoir cylinder 90 from the inside of the vertical supply tube 10.

The cover body 100 is formed to cover the entirety of the vertical supply tube 10 except for the lower end portion, the entirety of the injection tube portion 11, and the entirety of the reservoir cylinder 90 from at least both sides in the leftward/rightward direction and above.

As illustrated in FIGS. 1 and 2, a first connection plate 110 is formed above the injection tube portion 11.

The first connection plate 110 has a plate shape extending forward from an upper end portion of the front wall portion 92 of the reservoir cylinder 90. Accordingly, the first connection plate 110 has a rectangular shape extending in the forward/rearward direction and the leftward/rightward direction in a plan view.

An interlock hole 111 penetrating the first connection plate 110 in the upward/downward direction is formed in the first connection plate 110. The shape of the interlock hole 111 is not particularly limited. However, for example, the interlock hole 111 may be formed to open in a rectangular shape in a plan view.

Moreover, expansion portions 112 protruding upward and coming into contact with the cover body 100 from below are formed on an upper surface of the first connection plate 110.

For example, the expansion portion 112 expands upward in a hemispherical shape in a longitudinal cross-sectional view and is formed in a laterally long shape extending in the forward/rearward direction throughout the overall length of the first connection plate 110. A pair of expansion portions 112 extend parallel to each other and are arranged in the leftward/rightward direction with the interlock hole 111 interposed therebetween.

The shape and position of the expansion portion 112 are not limited to this case and may be suitably changed.

As the expansion portions 112 of the first connection plate 110 come into contact with the cover body 100 from below, upward displacement of the first connection plate 110 is curbed.

(Nozzle Member)

As illustrated in FIGS. 1 and 2, the nozzle member 3 is assembled to the sprayer main body 2 mainly utilizing the injection tube portion 11.

The nozzle member 3 includes a mounting tube portion 120 externally fitted to the injection tube portion 11 from the front, a restriction wall 121 extending downward from the mounting tube portion 120, a connection wall 122 extending upward from the mounting tube portion 120, a nozzle shaft portion 123 disposed inside the front end portion of the mounting tube portion 120, and a second connection plate 124 extending rearward from the connection wall 122.

The mounting tube portion 120 includes a front tube portion 120*a* extending forward from the restriction wall 121 and the connection wall 122, and a rear tube portion 120*b* extending rearward from the restriction wall 121 and the connection wall 122. The rear tube portion 120*b* of the mounting tube portion 120 is tightly externally fitted to the injection tube portion 11 from the front side.

The rear tube portion 120*b* of the mounting tube portion 120 is not externally fitted to the injection tube portion 11 throughout the overall length thereof and is externally fitted to a base end portion of the injection tube portion 11, that is, to a part of the injection tube portion 11 excluding the rear end portion (root side). Accordingly, a rear end edge of the rear tube portion 120*b* is disposed in front of the front wall portion 92 in a state in which a gap in the forward/rearward direction is provided between the rear end edge of the rear tube portion 120*b* and the front wall portion 92.

The nozzle shaft portion 123 is disposed inside the front tube portion 120*a* of the mounting tube portion 120 and coaxially with the injection tube portion 11. A center axis of the nozzle shaft portion 123 is positioned slightly above the axis O2 of the reservoir cylinder 90. A front end portion of the nozzle shaft portion 123 is positioned slightly behind a front end portion of the front tube portion 120*a* of the mounting tube portion 120.

A nozzle cap 125, which opens forward and in which the spray hole 4 for spraying a liquid forward is formed, is mounted on the nozzle shaft portion 123. The spray hole 4 is located coaxially with the injection tube portion 11. A communication path (not illustrated) allowing the inside of a part of the front tube portion 120*a* of the mounting tube portion 120 positioned behind the nozzle shaft portion 123 and the spray hole 4 to communicate with each other is provided between an outer surface of the nozzle shaft portion 123 and an inner surface of the nozzle cap 125.

As a lower end edge of the restriction wall 121 abuts an upper end portion of the trigger portion 51 from above, the restriction wall 121 positions the trigger portion 51 at the foremost swing position and restricts further forward swinging of the trigger portion 51.

The second connection plate 124 has a plate shape extending rearward from an upper end portion of the connection wall 122. Accordingly, the second connection plate 124 has a rectangular shape extending in the forward/rearward direction and the leftward/rightward direction in a plan view and is disposed parallel to the first connection plate 110. The second connection plate 124 is positioned between the mounting tube portion 120 and the first connection plate 110 and is disposed so as to overlap the first connection plate 110 from below.

An interlock protrusion 126 protruding upward is formed on the second connection plate 124, and enters the interlock hole 111 formed in the first connection plate 110 and is interlocked with the interlock hole III from behind. Accordingly, the entirety of the nozzle member 3 is assembled to the injection tube portion 11 in a locked state such that the nozzle member 3 is prevented from relatively moving forward with respect to the injection tube portion 11.

Moreover, the second connection plate 124 extends rearward beyond the mounting tube portion 120 and surrounds a rear end portion of the injection tube portion 11. In addition to this, the second connection plate 124 is sandwiched between the first connection plate 110 and the injection tube portion 11 in the upward/downward direction. Specifically, a protrusion portion 127 protruding upward and disposed below a rear end portion of the second connection plate 124 is formed on an outer circumferential surface of the injection tube portion 11 on the rear end portion side positioned behind the mounting tube portion 120, such that the rear end portion of the second connection plate 124 is sandwiched between the protrusion portion 127 and the first connection plate 110. In the illustrated example, the protrusion portion 127 has a rib shape extending in the forward/rearward direction.

In the trigger-type liquid sprayer 1, as illustrated in FIGS. 1 and 2, a displacement curbing portion 150 for curbing displacement of the rear tube portion (rear cylinder portion) 97 of the reservoir cylinder 90 with respect to the vertical supply tube 10 is provided between the rear tube portion 97 and the vertical supply tube 10. The displacement curbing portion 150 includes a reinforcement rib 151 which is formed integrally with the vertical supply tube 10 and the rear tube portion 97 such that the vertical supply tube 10 and the rear tube portion 97 are integrally connected to each other.

The reinforcement rib 151 is formed to integrally connect the small diameter portion 12*b* of the outer tube 12 of the vertical supply tube 10 and the rear tube portion 97 to each other. Specifically, the reinforcement rib 151 is formed on an outer circumferential surface of a rear portion of the small diameter portion 12*b* and has a longitudinal rib shape extending in the upward/downward direction throughout the overall length of the small diameter portion 12*b*. A lower end portion of the reinforcement rib 151 reaches the annular connection portion 12*c* of the outer tube 12 and is formed integrally with the annular connection portion 12*c*. An upper end portion of the reinforcement rib 151 reaches the rear tube portion 97 and is formed integrally with the rear tube portion 97.

Accordingly, the vertical supply tube 10 and the rear tube portion 97 are firmly integrally connected to each other with the reinforcement rib 151 therebetween. Particularly, since the reinforcement rib 151 is interposed between the annular connection portion 12*c* and the rear tube portion 97 in the upward/downward direction, it is possible to effectively curb displacement of the rear tube portion 97 in the upward/downward direction with respect to the vertical supply tube 10.

(Operation of Trigger-Type Liquid Sprayer)

Next, a case of using the trigger-type liquid sprayer 1 will be described. Note that the respective parts of the trigger-type liquid sprayer 1 are filled with a liquid by a plurality of times of operations of the trigger portion 51, and the liquid can be sucked up into the vertical supply pipe 10.

After the stopper T illustrated in FIG. 1 is detached, when the trigger portion 51 is operated to be pulled rearward against a biasing force of the coil spring 54, the main piston 52 moves rearward from the foremost position, and the inside of the main cylinder 53 is compressed. Accordingly, a liquid inside the main cylinder 53 is supplied to the inside of the inner tube 13 of the vertical supply tube 10 through the inside of the communication tube portion 53*d*. Then, the liquid supplied to the inner tube 13 presses down the ball valve 19 disposed at the upper end opening edge of the support tube portion 16 and pushes up the valve body portion 22 of the reservoir valve 20 such that the valve plate portion 22*a* is separated from the upper surface of the valve seat portion 13*e*.

Accordingly, a liquid inside the vertical supply tube 10 can be supplied to the storage space 90*a* of the reservoir cylinder 90 through the penetration hole 13*f*, the penetration hole 31*a*, the inside of the connection tube portion 30, and the supply hole 91 illustrated in FIG. 2 so that the storage space 90*a* is compressed. For this reason, the reservoir plunger 80 can be moved rearward from the forefront position against a biasing force of the bias member 81 in response to compression of the storage space 90*a* to store (fill) the liquid in the storage space 90*a*.

In an initial stage in which a liquid begins to be introduced into the storage space 90*a*, the liquid enters a gap between the inner circumferential surface of the front lip portion 25*a* and the outer circumferential surface of the front end portion of the plunger tube 25. For this reason, it is easy to move the reservoir plunger 80 rearward.

When the reservoir plunger 80 moves rearward, the closing wall 26 is separated rearward from the front wall portion 92 of the reservoir cylinder 90. Accordingly, the communication hole 95 can be opened, and a high-pressure liquid in the storage space 90*a* can be guided to the spray hole 4 through the communication hole 95 and the inside of the injection tube portion 11. Therefore, the liquid can be sprayed forward through the spray hole 4.

As described above, every time an operation of pulling the trigger portion 51 rearward is performed, a liquid can be sprayed through the spray hole 4, and a liquid can be stored in the storage space 90*a* by moving the reservoir plunger 80 rearward.

After that, when the trigger portion 51 is released, as the main piston 52 is moved back forward inside the main cylinder 53 by the elastic recovering force (biasing force) of the coil spring 54, the trigger portion 51 is moved back forward in conjunction with the movement of the main piston 52. For this reason, the inside of the main cylinder 53 can be decompressed such that the pressure in the main cylinder 53 becomes lower than the pressure in the container body A, and thus the ball valve 19 can be separated upward from the upper end opening edge of the support tube portion 16 in a state in which the valve body portion 22 of the reservoir valve 20 remains being pressed against the upper surface of the valve seat portion 13*e*. Therefore, a liquid inside the container body A can be sucked up into the vertical supply tube 10 and can be introduced into the main cylinder 53 through the inside of the support tube portion 16 and the inside of the communication tube portion 53*d*.

Accordingly, it is possible to prepare for the next spray.

If a rearward operation of the trigger portion 51 is stopped, although supply of a liquid to the storage space 90*a* through the inside of the vertical supply tube 10 and the inside of the connection tube portion 30 stops, the reservoir plunger 80 begins to move forward toward the forefront position due to a biasing force of the bias member 81.

At this time, outflow of a liquid from the storage space 90*a* to the inside of the vertical supply tube 10 is restricted by the reservoir valve 20.

Accordingly, a liquid accumulated in the storage space 90*a* can be guided to the spray hole 4 through the communication hole 95 and the inside of the injection tube portion 11, and the liquid can be continuously sprayed forward through the spray hole 4.

In this manner, not only when an operation of pulling the trigger portion 51 rearward is performed but also when an operation of the trigger portion 51 is not performed, a liquid can be sprayed, and continuous spraying of a liquid can be performed.

For instance, when an operation of pulling the trigger portion 51 rearward is performed in a state in which the reservoir plunger 80 is positioned at the rearmost position, there is a possibility that a liquid may be excessively supplied to the storage space 90*a* and liquid leakage, breakage of each portion, or the like may occur.

In the present embodiment, when the reservoir plunger 80 moves rearward to a certain extent, the front lip portion 25*a* reaches the communication grooves 94 so that the inside of the storage space 90*a* communicates with the inside of the container body A through the communication grooves 94, the recovery hole 99, and the recovery path 17. Namely, when the reservoir plunger 80 moves rearward, the inside of the storage space 90*a* and the inside of the container body A can communicate with each other utilizing the recovery path 17.

Therefore, a part of a liquid inside the storage space 90*a* can be returned to the inside of the container body A, and excessive supply of a liquid to the inside of the storage space 90*a* can be curbed. Accordingly, excessive increase in pressure inside the storage space 90*a* can be curbed, and occurrence of liquid leakage, breakage of each portion, and the like can be curbed.

As described above, according to the trigger-type liquid sprayer 1 of the present embodiment, not only when an operation of pulling the trigger portion 51 rearward is performed but also when an operation of the trigger portion 51 is not performed, a liquid can be sprayed, and continuous spraying of a liquid can be performed.

The upper end portion of the trigger portion 51 (fulcrum) is pivotally supported by the nozzle member 3 such that the trigger portion 51 is swingable, and the main piston 52 is interlocked with the intermediate portion (point of action) of the trigger portion 51. Therefore, for example, by operating the lower end portion (point of leverage) of the trigger portion 51, the main piston 52 can be efficiently moved utilizing a so-called principle of leverage. For this reason, operability of the trigger portion 51 can be improved.

Moreover, in the trigger-type liquid sprayer 1 of the present embodiment, the displacement curbing portion 150 for curbing displacement of the rear tube portion 97 with respect to the vertical supply tube 10 is provided between the rear tube portion 97 of the reservoir cylinder 90 and the vertical supply tube 10. Therefore, for example, even if an external force such as an impact due to a drop or an impact due to contact with the outside acts on the reservoir cylinder 90, displacement (deformation) of the rear tube portion 97, for example, in the upward/downward direction can be curbed.

For example, due to a drop impact or the like, even if an external force as indicated by Arrow F1 in FIG. 1 acts on the rear end portion of the rear tube portion 97, by providing the displacement curbing portion 150, displacement in which the rear tube portion 97 is folded downward starting from a connected portion between the rear tube portion 97 and the vertical supply tube 10 due to a rotation torque or the like caused by the external force can be curbed. Accordingly, the rigidity against an unexpected external force can be enhanced, and the impact resistance of the trigger-type liquid sprayer 1 can be improved.

Particularly, since the vertical supply tube 10 and the rear tube portion 97 are integrally connected to each other by the reinforcement rib 151 formed integrally with the vertical supply tube 10 and the rear tube portion 97 and having a longitudinal rib shape, the rigidity of the connected portion between the vertical supply tube 10 and the rear tube portion 97 can be effectively enhanced. For this reason, even if an external force as indicated by Arrow F2 in FIG. 1 acts on the nozzle member 3 due to a drop impact or the like, displacement in which the rear tube portion 97 is lifted upward starting from the connected portion between the rear tube portion 97 and the vertical supply tube 10 due to a rotation torque or the like caused by the external force can be effectively curbed.

As a result, a high-quality trigger-type liquid sprayer 1 having a high rigidity against a drop impact, a contact impact, and the like can be obtained.

Moreover, since the impact resistance can be improved, a larger internal volume (internal capacity) inside the reservoir cylinder 90 can be secured, for example, by forming the rear tube portion 97 to extend rearward beyond the vertical supply tube 10. Accordingly, more liquid can be reserved inside the reservoir cylinder 90 and the trigger-type liquid sprayer 1 suitable for continuous injection can be obtained.

Moreover, in the trigger-type liquid sprayer 1 of the present embodiment, the nozzle member 3 is assembled to the sprayer main body 2 by externally fitting the mounting tube portion 120 to the injection tube portion 11. Moreover, as the mounting tube portion 120 is externally fitted to the injection tube portion 11, the second connection plate 124 overlaps the first connection plate 110 from below in a state in which the interlock protrusion 126 is interlocked with the interlock hole 111 from behind, and the second connection plate 124 is sandwiched between the first connection plate 110 and the injection tube portion 11 in the upward/downward direction.

Therefore, detachment of the nozzle member 3 such as relative forward movement of the nozzle member 3 with respect to the injection tube portion 11 can be curbed, and displacement of the nozzle member 3 in the upward/downward direction with respect to the sprayer main body 2 can be curbed.

Second Embodiment

Next, hereinafter, a second embodiment of a trigger-type liquid sprayer according to the present invention will be described with reference to FIGS. 6 to 13. In description of the present embodiment, the same reference signs are applied to constituents similar to those of the first embodiment and description thereof will be omitted, and only different points will be described.

Figure 6:
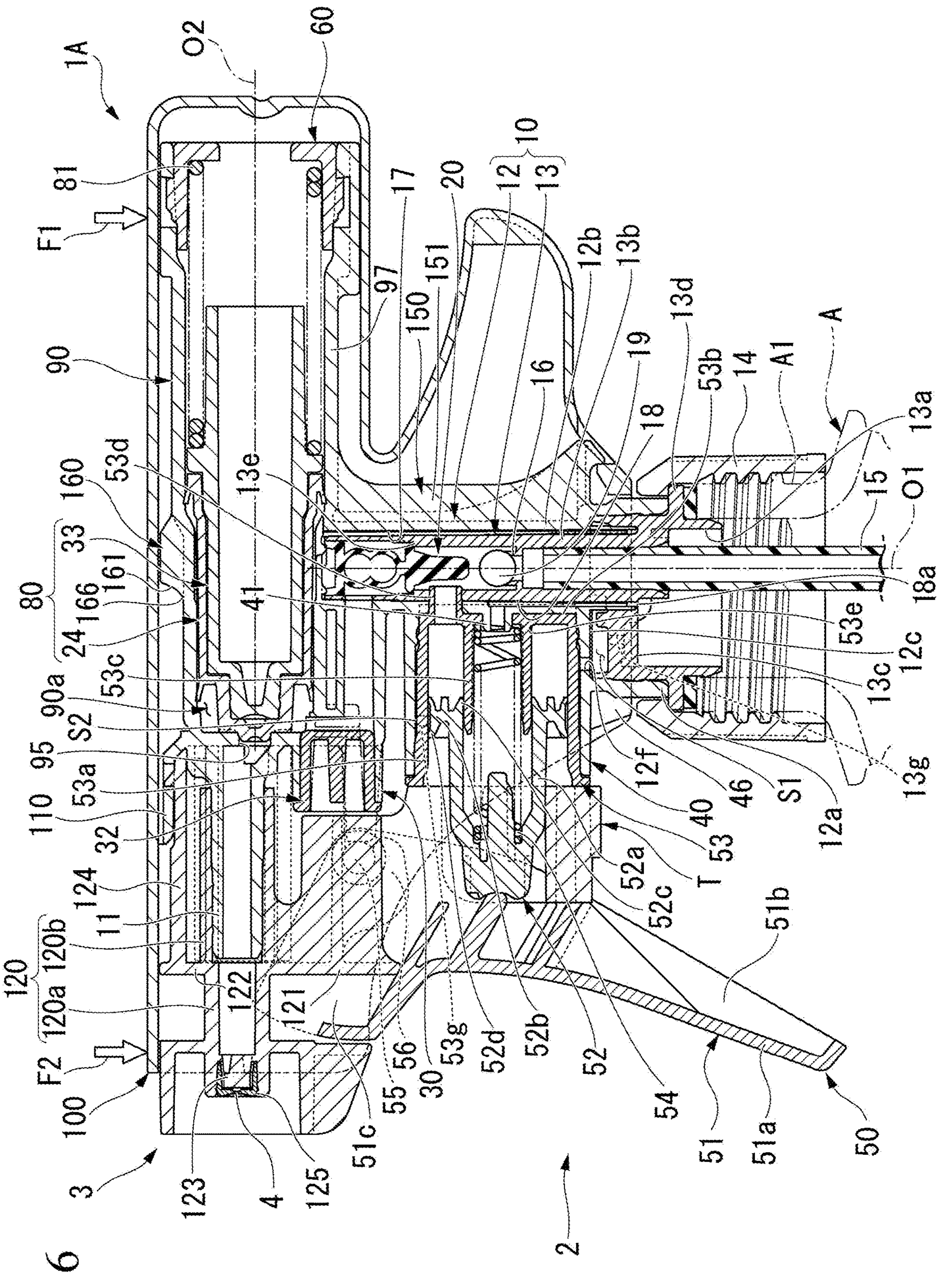
FIG. 6 is a longitudinal cross-sectional view illustrating a second embodiment of a trigger-type liquid sprayer according to the present invention.
Figure 7:
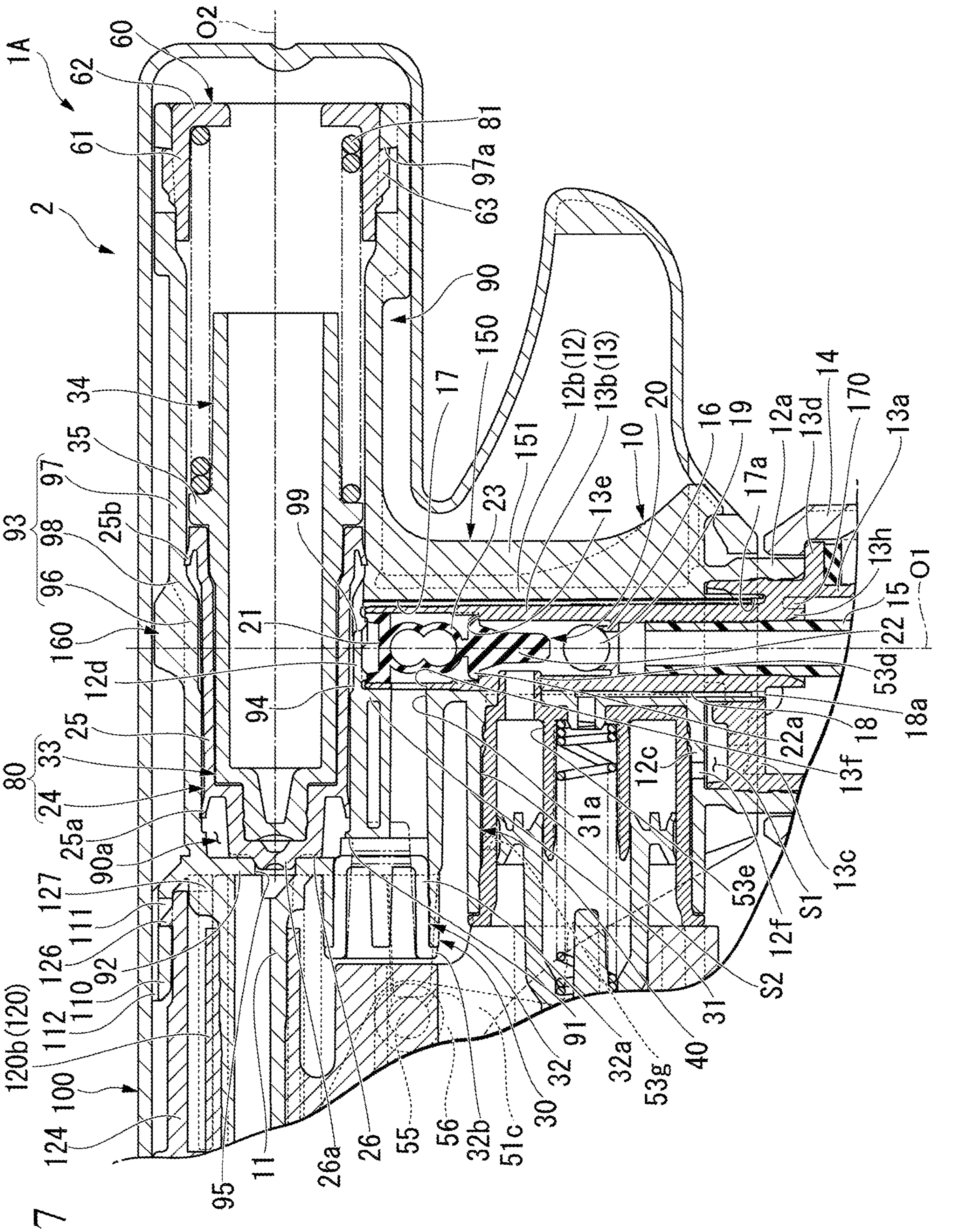
FIG. 7 is an enlarged longitudinal cross-sectional view of a periphery of a reservoir cylinder and the reservoir plunger illustrated in FIG. 6.

As illustrated in FIGS. 6 and 7, similar to the trigger-type liquid sprayer 1 of the first embodiment, a trigger-type liquid sprayer 1A of the present embodiment includes the sprayer main body 2 which is mounted on the container body A accommodating a liquid therein, and the nozzle member 3 having the spray hole for spraying a liquid and mounted on the sprayer main body 2.

Figure 8:
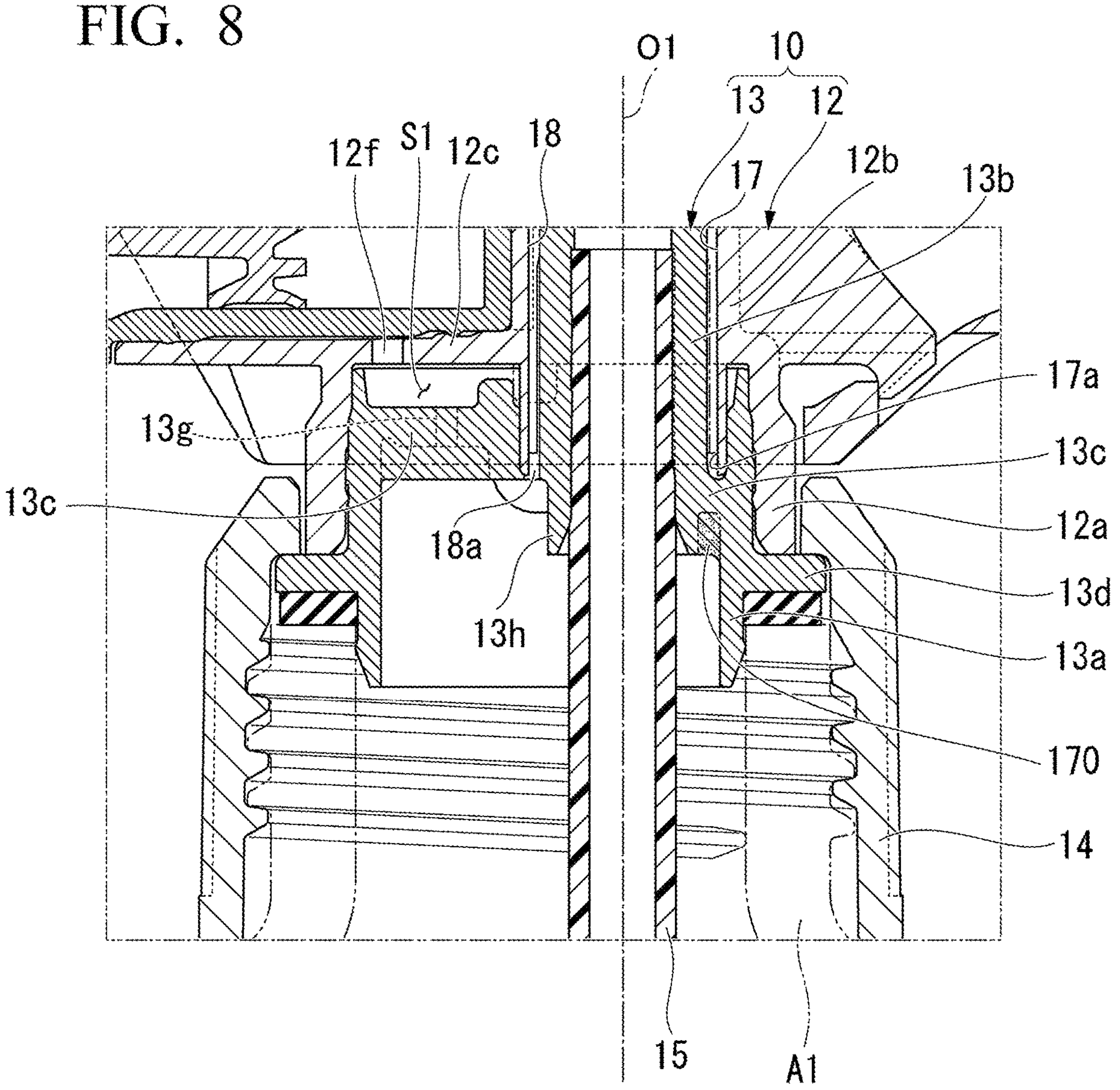
FIG. 8 is an enlarged longitudinal cross-sectional view of a periphery of an inner tube and a pipe illustrated in FIG. 6.

In the present embodiment, as illustrated in FIG. 8, the annular connection portion 13*c* is formed in a stepped state in the upward/downward direction such that a pan of the annular connection portion 13*c* positioned behind the small diameter portion 13*b* is positioned below a part of the annular connection portion 13*c* positioned in front of the small diameter portion 13*b*. However, it is not limited to this case, and the annular connection portion 13*c* may be formed such that the height of the annular connection portion 13*c* is the same throughout the whole circumference.

An annular pipe fitting tube 13*h* protruding downward from the annular connection portion 13*c* is formed in the small diameter portion 13*b*. The pipe fitting tube 13*h* opens downward and has a tapered shape in a longitudinal cross-sectional view in which the inner circumferential surface of the pipe fitting tube 13*h* has a diameter that is gradually increased downward. The pipe 15 is fitted into the small diameter portion 13*b* by being inserted into the small diameter portion 13*h* from below through the pipe fitting tube 13*h*.

Moreover, in the trigger-type liquid sprayer 1A of the present embodiment, as illustrated in FIGS. 7 and 9 to 11, an upper rib 160 is formed integrally on the outer circumferential surface of an upper end portion of the reservoir cylinder 90.

The upper rib 160 protrudes upward, is positioned on the axis O1 of the vertical supply tube 10 and extends in the forward/rearward direction. Specifically, the upper rib 160 is formed on an upper pan of the cylinder tube 93 and positioned in the connected portion between the front tube portion 96 and the stepped portion 98 in the cylinder tube 93.

The upper rib 160 includes a front wall surface (first wall surface) 161 facing the front side (the other side in the axial direction), a rear wall surface (second wall surface) 162 facing the rear side (one side in the axial direction), a pair of side wall surfaces 163 facing outward in the leftward/rightward direction and connected to the front wall surface 161 and the rear wall surface 162, and a flat top wall surface 164 disposed above the front tube portion 96 and connected to the front wall surface 161, the rear wall surface 162 and the pair of side wall surfaces 163.

The upper rib 160 is formed such that the length in the forward/rearward direction is longer than the width in the leftward/rightward direction. The upper rib 160 in the illustrated example is formed such that the width is increased in the middle portion in the forward/rearward direction instead of the width being uniform throughout the overall length in the forward/rearward direction. Therefore, the upper rib 160 is provided with a pair of expansion portions 165 expanding outward in the leftward/rightward direction.

The pair of expansion portions 165 are formed at positions closer to the front wall surface 161 than an intermediate portion of the upper rib 160 in the forward/rearward direction. The upper rib 160 is disposed such that a part of the upper rib 160 having the largest width by the pair of expansion portions 165 is positioned immediately above the axis O1 of the vertical supply tube 10.

The side wall surfaces 163 are formed to expand outward in the leftward/rightward direction in accordance with expansion of the expansion portions 165.

All the front wall surface 161, the rear wall surface 162, and the pair of side wall surfaces 163 are inclined surfaces spreading outward and downward from the top wall surface 164. This will be described below in detail. The rear wall surface 162 is disposed such that it covers the stepped portion 98 from above and is connected to a boundary part between the stepped portion 98 and the rear tube portion 97.

The front, wall surface 161 is an inclined surface inclined to extend rearward and upward from an outer circumferential surface of the reservoir cylinder 90, that is, from an outer circumferential surface of the front tube portion 96. Specifically, the front wall surface 161 is formed such that, an inclination angle θ1 of the front wall surface 161 with respect to the outer circumferential surface of the front tube portion 96 becomes an acute angle smaller than 90 degrees, for example, 65 degrees in a side view of the reservoir cylinder 90.

Moreover, a first curved surface part 166 recessed rearward in a side view of the reservoir cylinder 90 is formed in a connected portion between the front wall surface 161 and the outer circumferential surface of the front tube portion 96. In the illustrated example, the first curved surface part 166 has a recessed curved surface shape having a curvature radius of 2 mm in a side view of the reservoir cylinder 90.

A connected portion between the front wall surface 161 and the top wall surface 164 is a curved surface part having a curvature radius of 0.5 mm in a side view of the reservoir cylinder 90. The curvature radius of this curved surface part is not limited to 0.5 mm and may be suitably changed.

Figure 9:
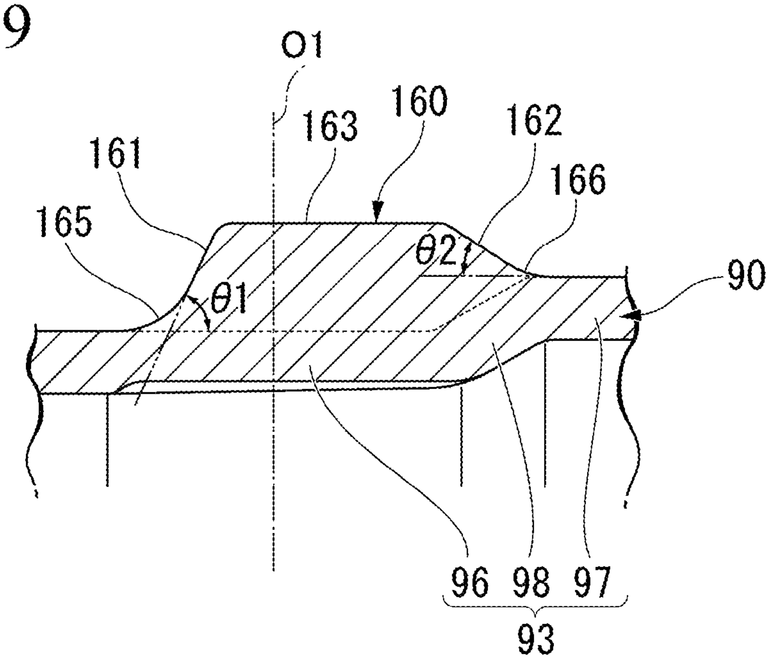
FIG. 9 is an enlarged longitudinal cross-sectional view of an upper rib illustrated in FIG. 6.

As illustrated in FIG. 9, the rear wall surface 162 is an inclined surface inclined to extend forward and upward from the outer circumferential surface of the reservoir cylinder 90, that is, from an outer circumferential surface of the rear tube portion 97 in a side view of the reservoir cylinder 90. Specifically, the rear wall surface 162 is formed such that an inclination angle θ2 of the rear wall surface 162 with respect to the outer circumferential surface of the rear tube portion 97 becomes an acute angle smaller than 90 degrees, for example, 45 degrees in a side view of the reservoir cylinder 90.

Moreover, a second curved surface part 167 recessed forward in a side view of the reservoir cylinder 90 is formed in a connected portion between the rear wall surface 162 and the outer circumferential surface of the rear tube portion 97. In the illustrated example, the second curved surface pan 167 has a recessed curved surface shape having a curvature radius of 2 mm in a side view of the reservoir cylinder 90.

A connected portion between the rear wall surface 162 and the top wall surface 164 is a curved surface part having a curvature radius of 0.5 mm in a side view of the reservoir cylinder 90. The curvature radius of this curved surface part is not limited to 0.5 mm and may be suitably changed.

Figure 10:
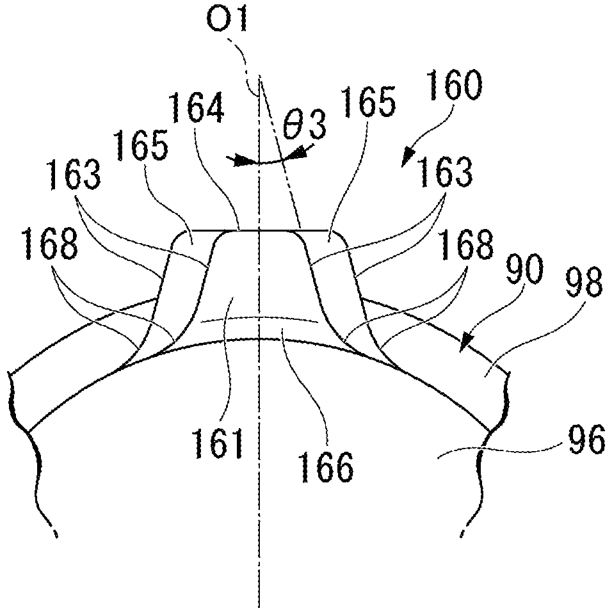
FIG. 10 is a front view of the upper rib illustrated in FIG. 9.
Figure 11:
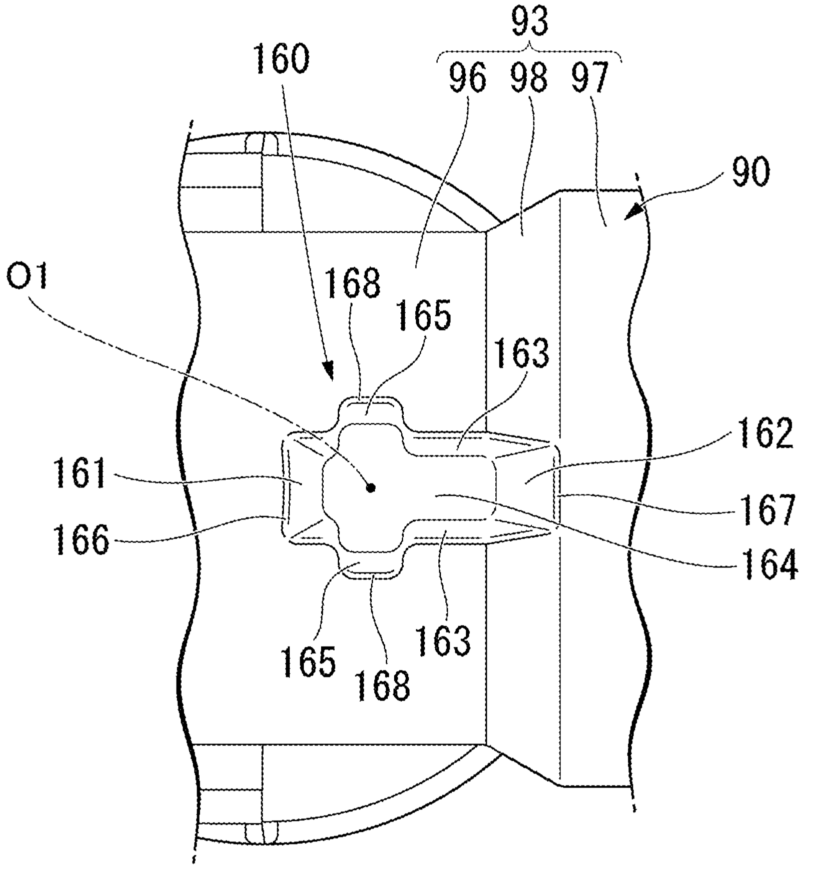
FIG. 11 is a plan view of the upper rib illustrated in FIG. 9 viewed from above.

As illustrated in FIG. 10, the pair of side wall surfaces 163 are inclined surfaces inclined to extend inward in the leftward/rightward direction and upward from the outer circumferential surface of the reservoir cylinder 90, that is, from the outer circumferential surface of the front tube portion 96 in a front view of the reservoir cylinder 9) viewed in a direction of the axis O2. Specifically, the pair of side wall surfaces 163 are inclined such that an inclination angle θ3 of the side wall surface 163 with respect to the axis O1 of the vertical supply tube 10 becomes an acute angle smaller than 90 degrees, for example, 15 degrees in a front view of the reservoir cylinder 90.

Moreover, third curved surface pans 168 recessed downward in a front view of the reservoir cylinder 90 are formed in connected portions between the pair of side wall surfaces 163 and the outer circumferential surface of the front tube portion 96. In the illustrated example, the third curved surface part 168 has a recessed curved surface shape having a curvature radius of 2 mm similarly to the first curved surface part 166 and the second curved surface part 167.

Connected portions between the pair of side wall surfaces 163 and the top wall surface 164 are curved surface parts having a curvature radius of 0.5 mm in a front view of the reservoir cylinder 90. The curvature radius of this curved surface part is not limited to 0.5 mm and may be suitably changed.

As illustrated in FIG. 6, an upward protruding amount (rib height) of the upper rib 160 is set such that the top wall surface 164 constitutes a part of the outermost diameter portion of the reservoir cylinder 90. Particularly, the rib height of the upper rib 160 is set such that the upper rib 160 is disposed at the highest position (including height positions equivalent to other constituent members) among constituent members (excluding the cover body 100) such as the injection tube portion 11, the first connection plate 110, and the nozzle member 3 in addition to the reservoir cylinder 90.

Figure 12:
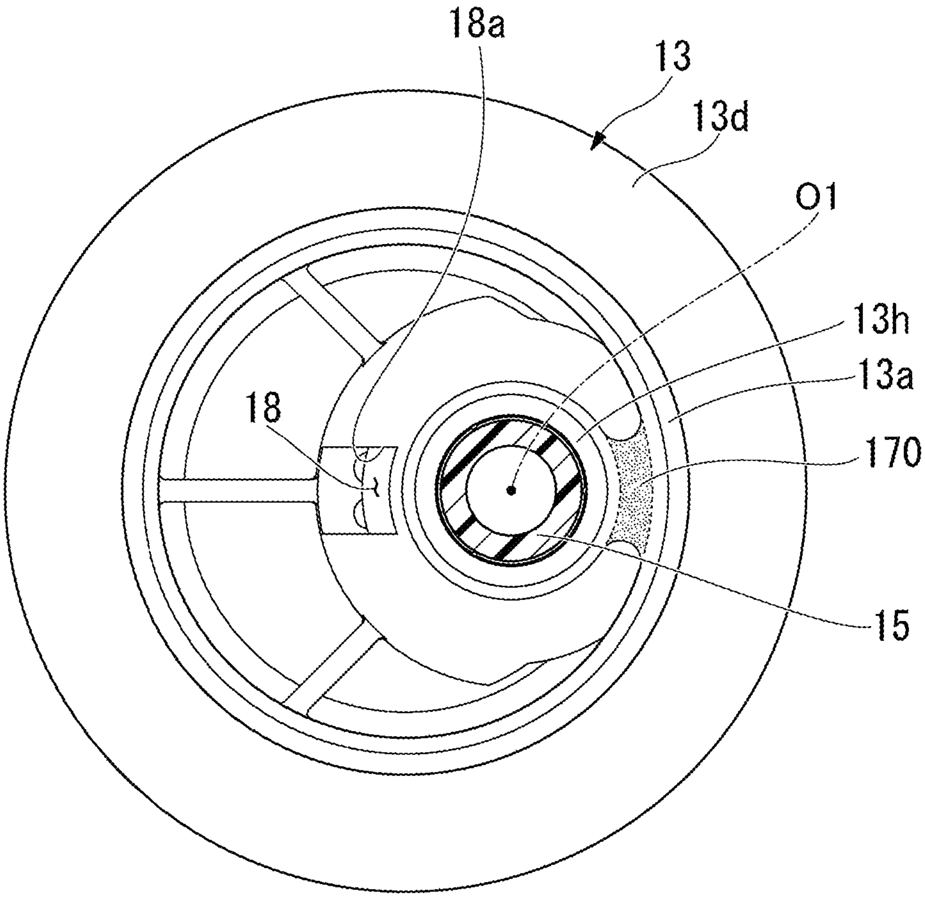
FIG. 12 is a plan view of the inner tube illustrated in FIG. 8 viewed from below.

Moreover, in the trigger-type liquid sprayer 1A of the present embodiment, as illustrated in FIGS. 8 and 12, a connection reinforcement portion 170 integrally connecting the pipe fitting tube 13*h* and the large diameter portion 13*a* to each other in the radial direction is formed at a rear part of the pipe fitting tube 13*h* of the inner tube 13. Accordingly, the strength of the rear part of the annular connection portion 13*c* can be improved and the rigidity thereof can be enhanced.

Particularly, the connection reinforcement portion 170 is disposed between the pipe fitting tube 13*h* and the large diameter portion 13*a*, has a circular arc shape extending in the circumferential direction in a plan view, and is formed integrally with the annular connection portion 13*c* and connected to the annular connection portion 13*c* from below. Accordingly, the strength of the rear part of the annular connection portion 3*c* can be effectively improved and the rigidity thereof can be enhanced. In addition to this, since the connection reinforcement portion 170 extends in the circumferential direction, the rear part of the pipe fitting tube 13*h* and the large diameter portion 13*a* can be integrally connected to each other over a wider range, and the rigidity of the rear part of the annular connection portion 13*c* can be further enhanced.

Moreover, according to the trigger-type liquid sprayer 1A of the present embodiment, since the upper rib 160 is provided in the reservoir cylinder 90, the vertical supply tube 10 and the reservoir cylinder 90 can be accurately assembled with favorable setting properties at the time of assembling.

Figure 13:
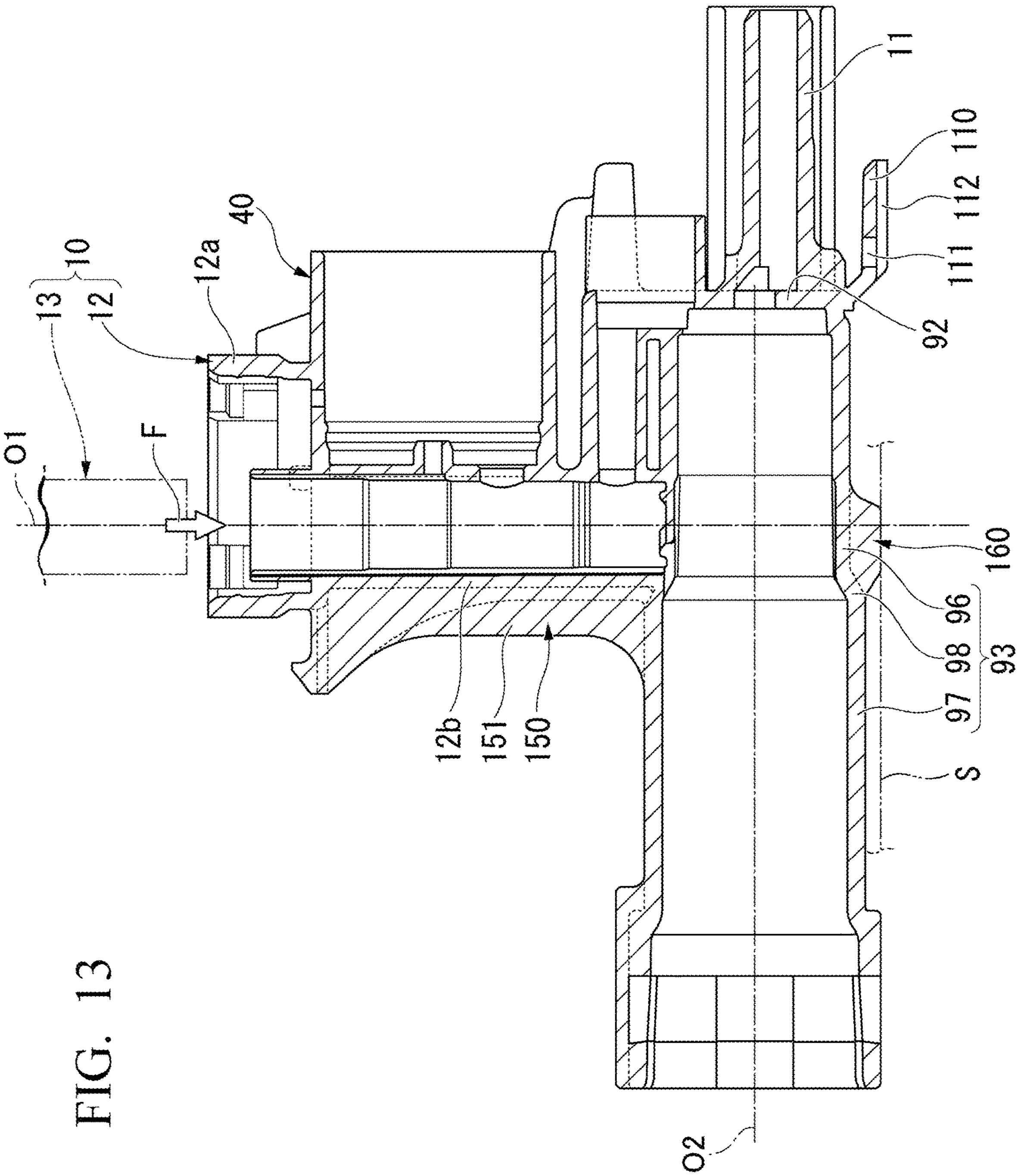
FIG. 13 is a view when the inner tube is fitted into an outer tube formed integrally with the reservoir cylinder during assembling of the trigger-type liquid sprayer illustrated in FIG. 6.

That is, as illustrated in FIG. 13, since the upper rib 160 is provided in the reservoir cylinder 90 such that it is positioned on the axis O1 of the vertical supply tube 10, when the inner tube 13 is fitted into the outer tube 12 formed integrally with the reservoir cylinder 90 by plugging or the like, a load F transmitted from the inner tube 13 to the reservoir cylinder 90 by plugging can be appropriately received utilizing the upper rib 160.

Particularly, as illustrated in FIG. 6, since the upper rib 160 is disposed at the highest position among constituent members (excluding the cover body 100) such as the injection tube portion 11, the first connection plate 110, and the nozzle member 3 in addition to the reservoir cylinder 90, at the time of assembling illustrated in FIG. 13, for example, in a state in which the upper rib 160 is brought into contact with a setting surface S, the inner tube 13 can be fitted into the outer tube 12 by plugging or the like. Accordingly, the load F can be appropriately received utilizing the upper rib 160. As a result, the vertical supply tube 10 and the reservoir cylinder 90 can be accurately assembled with favorable setting properties.

When the upper rib 160 is not formed in the reservoir cylinder 90, as illustrated in FIG. 7, a part of the reservoir cylinder 90 positioned on the axis O1 of the vertical supply tube 10 is the front tube portion 96 having a lower height than the rear tube portion 97. For this reason, as illustrated in FIG. 13, when the inner tube 13 is fitted into the outer tube 12 by plugging or the like, if the upper rib 160 is not formed, there is a possibility that the front tube portion 96 may be displaced (warped or the like) due to the load F from the inner tube 13 by plugging, and the vertical supply tube 10 and the reservoir cylinder 90 may be improperly set.

However, according to the present embodiment, since the upper rib 160 is provided, such improper setting will not occur.

Moreover, as illustrated in FIG. 9, the front wall surface 161 of upper rib 160 is an inclined surface having the inclination angle θ1 of 65 degrees with respect to the outer circumferential surface of the front tube portion 96 of the reservoir cylinder 90, instead of a vertical surface forming, for example, a right angle. In addition to this, the first curved surface part 166 is formed in the connected portion between the front wall surface 161 and the outer circumferential surface of the front tube portion 96.

Similarly, the rear wall surface 162 of the upper rib 160 is an inclined surface having the inclination angle θ2 of 45 degrees with respect to the outer circumferential surface of the rear tube portion 97 of the reservoir cylinder 90. Furthermore, the second curved surface part 167 is formed in the connected portion between the rear wall surface 162 and the outer circumferential surface of the rear tube portion 97.

Accordingly, for example, even if an impact force due to a drop impact or contact with the outside acts on the reservoir cylinder 90 and the reservoir cylinder 90 is displaced such that it is folded in the upward/downward direction due to a rotation torque or the like caused by this, occurrence of a flaw such as cracking in the connected portions between the reservoir cylinder 90, and the front wall surface 161 and the rear wall surface 162 can be curbed.

Specifically, due to a drop impact or the like, when an impact force as indicated by Arrow F1 in FIG. 6 acts on the rear end portion of the rear tube portion 97 of the reservoir cylinder 90, there is a possibility of displacement in which the rear tube portion 97 is folded downward starting from the connected portion between the rear tube portion 97 and the vertical supply tube 10 due to a rotation torque or the like caused by an impact force. On the contrary, when an impact force as indicated by Arrow F2 in FIG. 6 acts on the nozzle member 3, there is a possibility of displacement in which the rear tube portion 97 is lifted upward due to a rotation torque or the like.

When such displacement occurs, there is a possibility that, for example, a local tensile force, a local compressive force, or the like may act on the connected portion between the reservoir cylinder 90 and the front wall surface 161 of the upper rib 160 and the connected portion between the reservoir cylinder 90 and the rear wall surface 162 of the upper rib 160, and a flaw such as cracking may occur due to this force.

However, according to the upper rib 160 of the present embodiment, the front wall surface 161 and the rear wall surface 162 are inclined surfaces. Furthermore, the front wall surface 161 is connected to the outer circumferential surface of the front tube portion 96 with the first curved surface part 166 therebetween, and the rear wall surface 162 is connected to the outer circumferential surface of the rear tube portion 97 with the second curved surface part 167 therebetween. Therefore, a local tensile force, a local compressive force, or the like can be alleviated, and therefore the foregoing flaw is unlikely to occur.

Therefore, the rigidity against an unexpected external force (an impact force or the like) can be enhanced, and the impact resistance of the trigger-type liquid sprayer 1A can be improved. As a result, a high-quality trigger-type liquid sprayer 1A having high rigidity against a drop impact, a contact impact, or the like can be obtained. Moreover, since the impact resistance can be improved, a larger internal volume (internal capacity) inside the reservoir cylinder 90 can be secured, for example, by forming the rear tube portion 97 to extend rearward beyond the vertical supply tube 10. Accordingly, more liquid can be reserved inside the reservoir cylinder 90 and the trigger-type liquid sprayer 1A suitable for continuous injection can be obtained.

Moreover, in the upper rib 160, not only the front wall surface 161 and the rear wall surface 162 but also the pair of side wall surfaces 163 are inclined, and the pair of side wall surfaces 163 are connected to the outer circumferential surface of the front tube portion 96 with the third curved surface parts 168 therebetween. Therefore, for example, even if the reservoir cylinder 90 is displaced such that it is twisted in the leftward/rightward direction due to an impact force, occurrence of a flaw such as cracking in the connected portion between the pair of side wall surfaces 163 and the front, tube portion 96 can be curbed.

As described above, according to the trigger-type liquid sprayer 1A of the present embodiment, setting properties of the vertical supply tube 10 and the reservoir cylinder 90 can be improved utilizing the upper rib 160 and the trigger-type liquid sprayer 1A having exceptional impact resistance can be obtained.

Moreover, according to the trigger-type liquid sprayer 1A of the present embodiment, as illustrated in FIG. 8, since the connection reinforcement portion 170 integrally connecting the large diameter portion 13*a*, which is fitted into the mouth portion A1 of the container body A, and the pipe fitting tube 13*h* to each other in the radial direction is provided at the rear pan of the pipe fitting tube 13*h*, the strength of the rear part of the annular connection portion 13*c* can be improved and the rigidity thereof can be enhanced. Accordingly, for example, even if an impact force due to a drop impact or contact with the outside acts on the reservoir cylinder 90 and the vertical supply tube 10 is displaced so as to warp or tilt, displacement such as warpage of the rear part of the annular connection portion 13*c* can be curbed. Accordingly, occurrence of a flaw such as cracking in the connected portion between the rear part of the annular connection portion 13*c* and the pipe fitting tube 13*h* or the like can be curbed. In addition, since it can be expected that the rigidity of the pipe fitting tube 13*h* be also improved by the connection reinforcement portion 170, occurrence of the foregoing flaw can be curbed. In this regard as well, the impact resistance of the trigger-type liquid sprayer 1A can be improved.

Moreover, in the trigger-type liquid sprayer 1A of the present embodiment, as illustrated in FIG. 6, since the displacement curbing portion 150 for curbing displacement of the rear tube portion 97 of the reservoir cylinder 90 with respect to the vertical supply tube 10 is provided between the rear tube portion 97 and the vertical supply tube 10, even if a drop impact or the like acts on the reservoir cylinder 90, displacement (deformation) of the rear tube portion 97, for example, in the upward/downward direction can be curbed.

Therefore, as described above, even if an external force as indicated by Arrow F1 in FIG. 6 acts on the rear end portion of the rear tube portion 97 due to a drop impact or the like, since the displacement curbing portion 150 is provided, displacement in which the rear tube portion 97 is folded downward can be curbed. Accordingly, the rigidity against an unexpected external force can be enhanced, and the impact resistance of the trigger-type liquid sprayer 1A can be improved. Moreover, since a load on the upper rib 160 and the connection reinforcement portion 170 can be reduced, occurrence of cracking or the like described above can be effectively curbed.

Moreover, since the reinforcement rib 151 having a longitudinal rib shape integrally connects the vertical supply tube 10 and the rear tube portion 97 to each other, the rigidity of the connected portion between the vertical supply tube 10 and the rear tube portion 97 can be effectively enhanced. For this reason, even when an external force as indicated by Arrow F2 in FIG. 6 acts on the nozzle member 3 due to a drop impact or the like, displacement in which the rear tube portion 97 is lifted upward due to a rotation torque or the like can also be effectively curbed.

Moreover, in the trigger-type liquid sprayer 1A of the present embodiment, as the mounting tube portion 120 is externally fitted to the injection tube portion 11, the nozzle member 3 is assembled to the sprayer main body 2, the second connection plate 124 overlaps the first connection plate 110 from below in a state in which the interlock protrusion 126 is interlocked with the interlock hole 111 from behind, and the second connection plate 124 is sandwiched between the first connection plate 110 and the injection tube portion 11 in the upward/downward direction.

Therefore, while restricting detachment of the nozzle member 3 such as relative forward movement of the nozzle member 3 with respect to the injection tube portion 11 (i.e., curbing detachment of the nozzle member 3) displacement of the nozzle member 3 with respect to the sprayer main body 2 in the upward/downward direction can be curbed.

Hereinabove, embodiments of the present invention have been described. However, these embodiments are presented as examples but are not intended to limit the scope of the invention. The embodiments can be performed in various other forms, and various omissions, replacements, and changes can be made within a range not departing from the gist of the invention. For example, the embodiments and modification examples thereof include those that can be easily assumed by those skilled in the art, those that are substantially the same, those within an equivalent range, and the like.

For example, in the foregoing embodiments, displacement of the rear tube portion 97 with respect to the vertical supply tube 10 is curbed utilizing the reinforcement rib 151 formed integrally with the vertical supply tube 10 and the rear tube portion 97, but it is not limited to the reinforcement rib 151.

Figure 3:
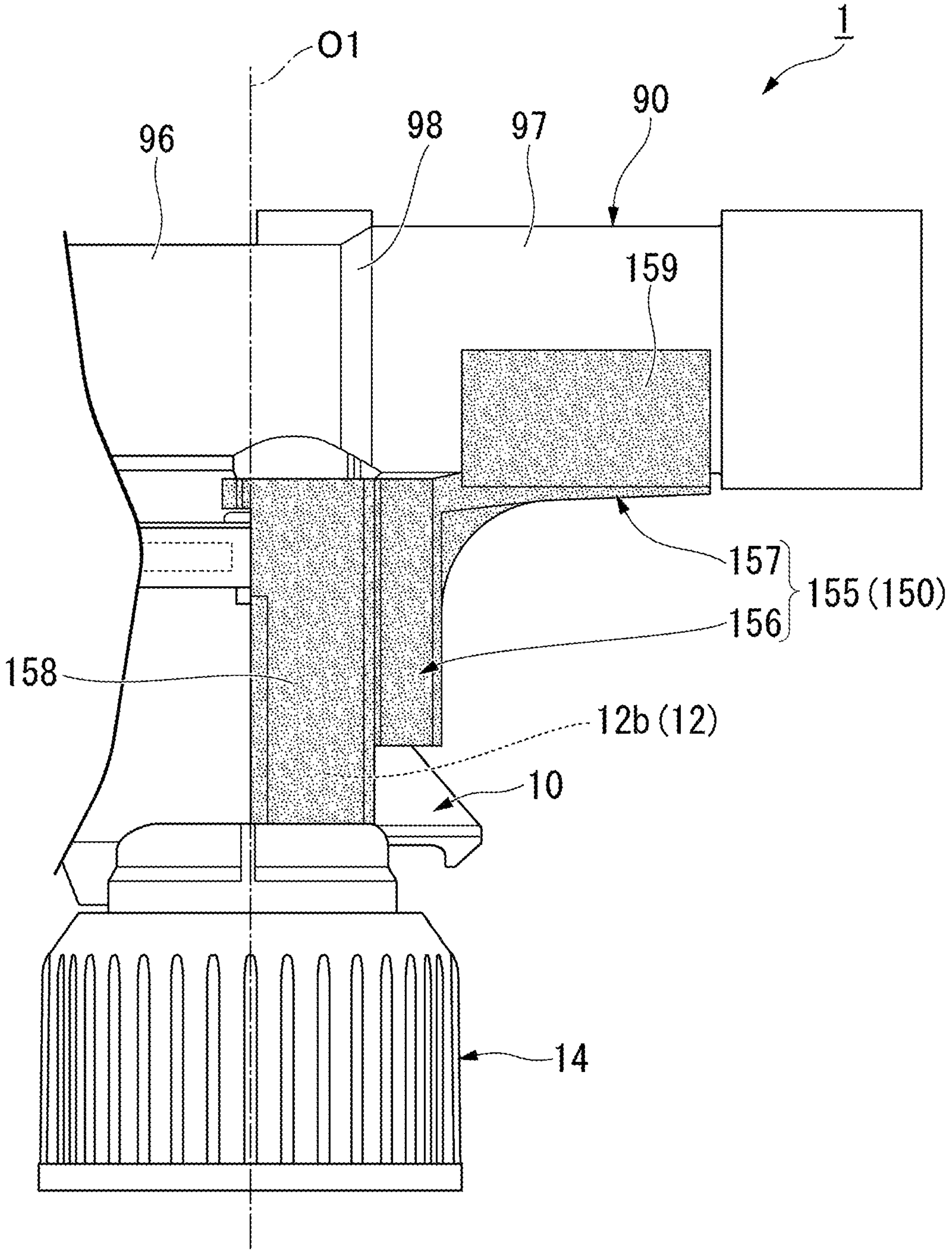
FIG. 3 is view illustrating a modification example of the first embodiment of the trigger-type liquid sprayer and is a side view of a periphery of a connected portion between a vertical supply tube and the reservoir plunger.
Figure 4:
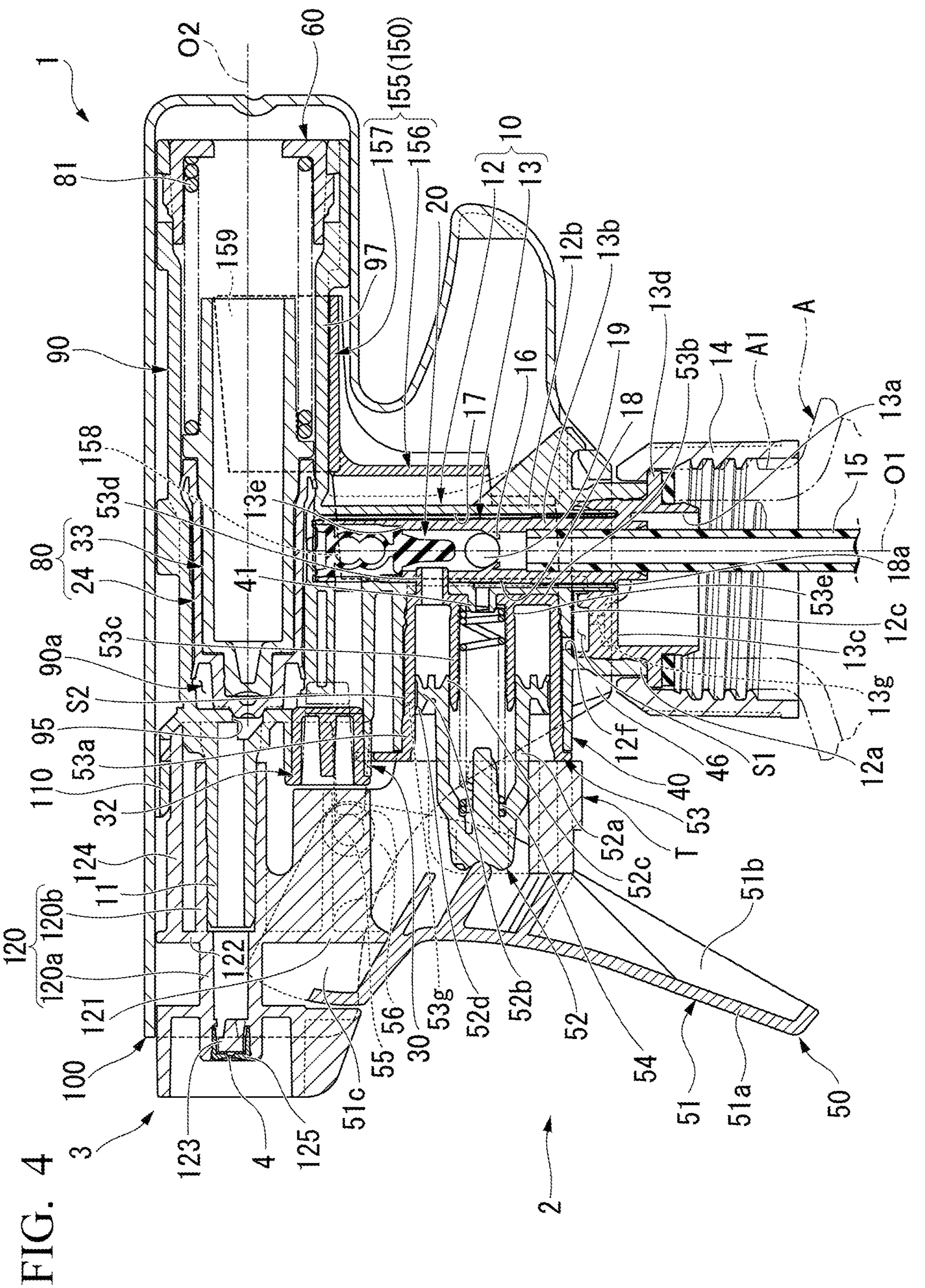
FIG. 4 is a longitudinal cross-sectional view of the trigger-type liquid sprayer illustrated in FIG. 3.

For example, as illustrated in FIGS. 3 and 4, the displacement curbing portion 150 may include a reinforcement body 155 mounted on the vertical supply tube 10 and the rear tube portion 97, and displacement of the rear tube portion 97 with respect to the vertical supply tube 10 may be curbed utilizing the reinforcement body 155 provided separately from the vertical supply tube 10 and the rear tube portion 97.

In FIG. 3, in order to make it easier to see, the reinforcement body 155 is illustrated by applying dotted hatching thereto.

The reinforcement body 155 includes a first reinforcement body 156 mounted on the vertical supply tube 10 from behind and holding the vertical supply tube 10, and a second reinforcement body 157 formed integrally with the first reinforcement body 156, mounted on the rear tube portion 97 from below, and holding the rear tube portion 97.

The first reinforcement body 156 includes a first clip portion 158 having a C-shape in a plan view and surrounding the small diameter portion 12*b* of the outer tube 12 of the vertical supply tube 10 from the outside in the radial direction thereof. For example, the first clip portion 158 is elastically deformable in the radial direction and can elastically hold the small diameter portion 12*b* when it is mounted on the small diameter portion 12*b* from behind.

The second reinforcement body 157 includes a second clip portion 159 having a C-shape in a side view and surrounding the rear tube portion 97 from the outside in the radial direction thereof. For example, the second clip portion 159 is elastically deformable in the radial direction and can elastically hold the small diameter portion 12*b* when it is mounted to the small diameter portion 12*b* from below.

Even when the reinforcement body 155 having such a constitution is utilized, the entire rigidity can be enhanced by integrally assembling the vertical supply tube 10 and the rear tube portion 97. Specifically, by mounting the first reinforcement body 156 on the vertical supply tube 10 from behind and mounting the second reinforcement body 157 on the rear tube portion 97 from below, the vertical supply tube 10 and the rear tube portion 97 are integrally connected to each other utilizing the reinforcement body 155 so that the entire rigidity can be enhanced. Therefore, it is possible to exhibit effects similar to those of the foregoing embodiments.

Particularly, since the separately provided reinforcement body 155 is utilized, moldability of the vertical supply tube 10 and the rear tube portion 97 is unlikely to be affected, and reinforcement is realized while the performance of spraying a liquid is appropriately maintained, in addition, since the reinforcement body 155 can be arbitrarily designed with a high degree of freedom, it is possible to effectively curb displacement of the rear tube portion 97.

Figure 5:
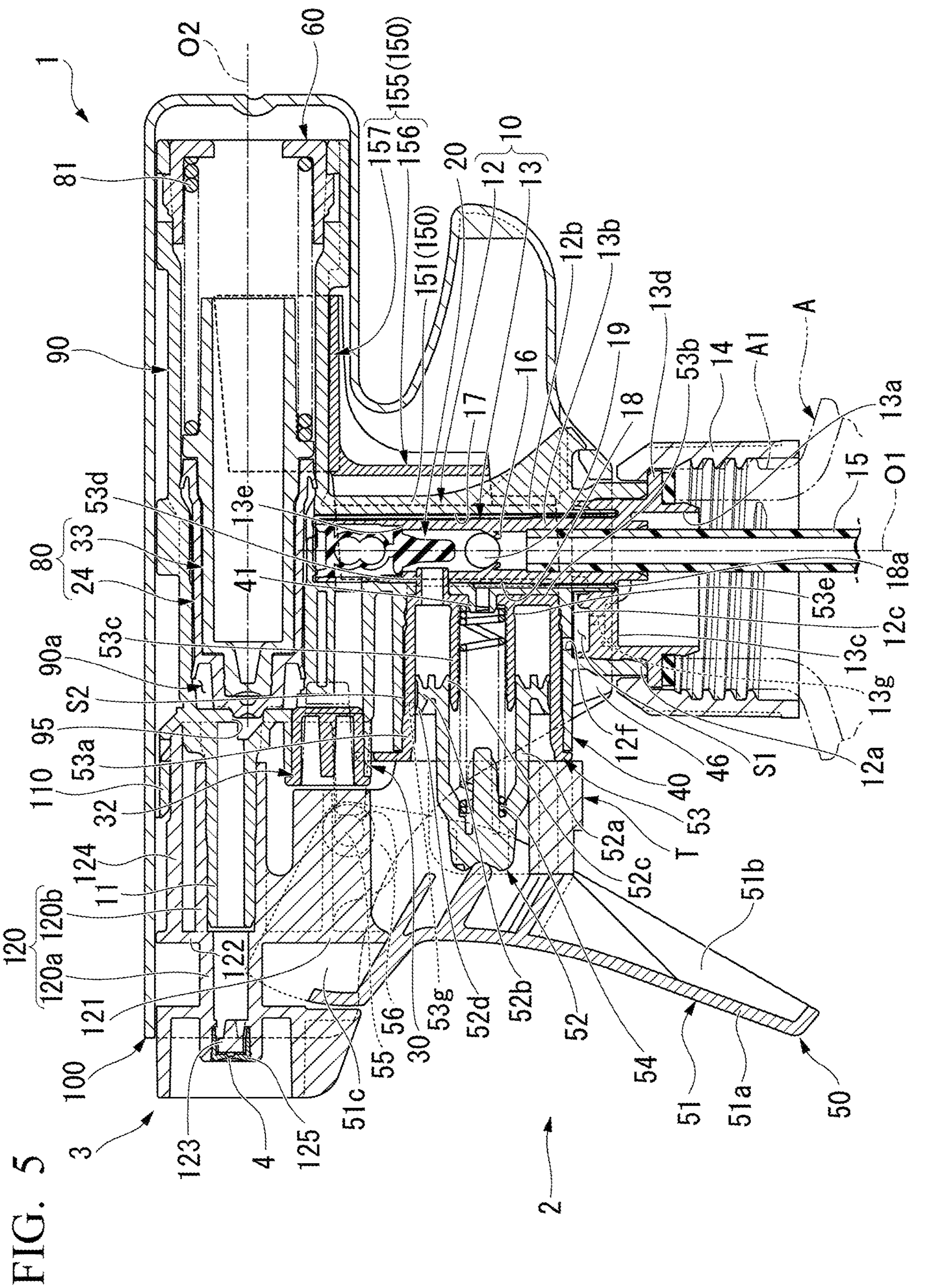
FIG. 5 is a longitudinal cross-sectional view illustrating another modification example of the first embodiment of the trigger-type liquid sprayer.

Even when the reinforcement body 155 is utilized, as illustrated in FIG. 5, the vertical supply tube 10 and the rear tube portion 97 may be integrally connected to each other utilizing the reinforcement rib 151, and the reinforcement body 155 may further be provided.

Moreover, the embodiments have described a constitution in which the reservoir plunger 80 closes the communication hole 95 and opens the communication hole 95 when it moves rearward against the bias member 81. However, for example, a constitution in which the reservoir plunger 80 closes the supply hole 91 formed in the reservoir cylinder 90 and opens the supply hole 91 when it moves rearward against the bias member 81 may be employed.

In addition, in the second embodiment, the upper rib 160 is formed such that the inclination angle θ1 of the front wall surface 161 becomes 65 degrees, but the inclination angle θ1 is not limited to 65 degrees as long as it is an acute angle (smaller than 90 degrees). However, it is preferable that the inclination angle θ1 be an angle of 45 degrees or larger. In this case, the rib height of the upper rib 160 can be easily secured, and the rigidity of the upper rib 160 can be enhanced. Therefore, at the time of assembling, a load transmitted from the inner tube 13 to the reservoir cylinder 90 can be more reliably received utilizing the upper rib 160, and the vertical supply tube 10 and the reservoir cylinder 90 can be accurately assembled with more favorable setting properties.

This also applies to the rear wall surface 162 and the pair of side wall surfaces 163.

Moreover, in the second embodiment, the upper rib 160 is formed such that the first curved surface part 166 has a recessed curved surface shape having a curvature radius of 2 mm, but it is not limited to this case. However, it is preferable to form the first curved surface part 166 such that the first curved surface pan 166 has a recessed curved surface shape having a curvature radius of 1.5 mm or larger and more preferably 2 mm or larger.

This also applies to the second curved surface part 167 and the third curved surface part 168.

When the curvature radii of the first curved surface part 166, the second curved surface pan 167 and the third curved surface part 168 are smaller than 1.5 mm, a boundary line (crossing ridgeline) is likely to appear in the connected portions between the front wall surface 161, the rear wall surface 162, and the pair of side wall surfaces 163, and the cylinder tube 93 of the reservoir cylinder 90, and for example, a V-shaped notch (cutout) in a cross-sectional view may be formed in the connected portions. Accordingly, when an impact force such as a drop impact or the like acts on the reservoir cylinder 90, concentration of stress is likely to occur where the notch has been formed, and this may cause breakage such as cracking in the connected portion between the upper rib 160 and the cylinder tube 93.

However, in the second embodiment, since the curvature radii of the first curved surface part 166, the second curved surface part 167, and the third curved surface part 168 are 1.5 mm or larger, the flaw is unlikely to occur.

INDUSTRIAL APPLICABILITY

According to the present invention, it is possible to provide a trigger-type liquid sprayer having exceptional impact resistance.

REFERENCE SIGNS LIST

A Container body
1 Trigger-type liquid sprayer
2 Sprayer main body
3 Nozzle member
4 Spray hole
10 Vertical supply tube
11 Injection tube portion
12 Outer tube
13 Inner tube
50 Trigger mechanism
51 Trigger portion
52 Main piston
53 Main cylinder
80 Reservoir plunger
90 Reservoir cylinder
97 Rear tube portion (rear cylinder portion)
150 Displacement cubing portion
151 Reinforcement rib
155 Reinforcement body
156 First reinforcement body
157 Second reinforcement body
160 Upper rib
161 Front wall surface (first wall surface)
162 Rear wall surface (second wall surface)
166 First curved surface part
167 Second curved surface pan

What is claimed is:

1. A trigger-type liquid sprayer comprising:

a sprayer main body mounted on a container body configured to accommodate a liquid therein; and a nozzle member having a spray hole for spraying the liquid forward, the nozzle member being mounted on a front end portion of the sprayer main body, wherein the sprayer main body includes:

a vertical supply tube extending in an upward/downward direction and configured to suck up the liquid in the container body;

a trigger mechanism having a trigger portion disposed in front of the vertical supply tube to be movable rearward in a state in which the trigger portion is biased forward, the trigger mechanism being configured to cause the liquid to flow from an inside of the vertical supply tube toward the spray hole in response to rearward movement of the trigger portion;

a reservoir cylinder into which the liquid that has passed through the inside of the vertical supply tube is supplied in response to rearward movement of the trigger portion; and a reservoir plunger disposed inside the reservoir cylinder to be movable in an axial direction along a center axis of the reservoir cylinder, and configured to move toward one side in the axial direction in response to supply of the liquid into the reservoir cylinder while being biased toward the other side in the axial direction, the reservoir cylinder is disposed above the vertical supply tube, intersects a center axis of the vertical supply tube, and protrudes rearward beyond the vertical supply tube, and a displacement curbing portion is provided between a rear cylinder portion of the reservoir cylinder protruding rearward beyond the vertical supply tube and the vertical supply tube, the displacement curbing portion being configured to curb displacement of the rear cylinder portion with respect to the vertical supply tube.

2. The trigger-type liquid sprayer according to claim 1, wherein the displacement curbing portion includes a reinforcement rib formed integrally with the vertical supply tube and the rear cylinder portion such that the vertical supply tube and the rear cylinder portion are integrally connected to each other.

3. The trigger-type liquid sprayer according to claim 1, wherein the displacement curbing portion includes a reinforcement body mounted on the vertical supply tube and the rear cylinder portion, and the reinforcement body includes:

a first reinforcement body mounted on the vertical supply tube from behind and holding the vertical supply tube; and a second reinforcement body formed integrally with the first reinforcement body, mounted on the rear cylinder portion from below, and holding the rear cylinder portion.

4. The trigger-type liquid sprayer according to claim 1, wherein the vertical supply tube includes an outer tube formed integrally with the reservoir cylinder, and an inner tube fitted into the outer tube, an upper rib protruding upward is formed integrally on an outer circumferential surface of an upper end portion of the reservoir cylinder, the upper rib being positioned on the center axis of the vertical supply tube and extending in the axial direction, the upper rib includes a first wall surface facing the other side in the axial direction and inclined to extend toward one side in the axial direction and upward from the outer circumferential surface of the reservoir cylinder, a first curved surface part is formed in a connected portion between the first wall surface and the outer circumferential surface of the reservoir cylinder, the first curved surface part being recessed toward one side in the axial direction in a side view of the reservoir cylinder, and the first curved surface part has a recessed curved surface shape having a curvature radius of 1.5 mm or longer in a side view of the reservoir cylinder.

5. The trigger-type liquid sprayer according to claim 4, wherein an inclination angle of the first wall surface with respect to the outer circumferential surface of the reservoir cylinder is 45 degrees or larger in a side view of the reservoir cylinder.

6. The trigger-type liquid sprayer according to claim 4, wherein the upper rib includes a second wall surface facing one side in the axial direction and inclined to extend toward the other side in the axial direction and upward from the outer circumferential surface of the reservoir cylinder, and a second curved surface part is formed in a connected portion between the second wall surface and the outer circumferential surface of the reservoir cylinder, the second curved surface part being recessed toward the other side in the axial direction in a side view of the reservoir cylinder.

7. The trigger-type liquid sprayer according to claim 1, wherein the displacement curbing portion includes a reinforcement rib formed integrally with the vertical supply tube and integrally with the rear cylinder portion such that the vertical supply tube and the rear cylinder portion are integrally connected to each other via the displacement curbing portion.

8. The trigger-type liquid sprayer according to claim 1, wherein the displacement curbing portion includes a reinforcement rib formed integrally with the vertical supply tube and the rear cylinder portion such that the vertical supply tube and the rear cylinder portion are integrally connected to each other, and wherein an upper end portion of the reinforcement rib reaches the rear cylinder portion and is formed integrally with the rear cylinder portion.

* * * * *